US012766838B2

(12) United States Patent
Yoshida et al.

(10) Patent No.: US 12,766,838 B2
(45) Date of Patent: Oct. 20, 2026

(54) LIQUID EJECTING HEAD AND LIQUID EJECTING SYSTEM

(71) Applicant: SEIKO EPSON CORPORATION, Tokyo (JP)

(72) Inventors: Shunsuke Yoshida, Matsumoto (JP); Toshihiro Shimizu, Fujimi-machi (JP); Naoto Yokoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 158 days.

(21) Appl. No.: 18/929,244

(22) Filed: Oct. 28, 2024

(65) Prior Publication Data

US 2025/0135775 A1 May 1, 2025

(30) Foreign Application Priority Data

Oct. 30, 2023 (JP) ................................. 2023-185255

(51) Int. Cl.
*B41J 2/14* (2006.01)
*B41J 2/045* (2006.01)

(52) U.S. Cl.
CPC ....... *B41J 2/14233* (2013.01); *B41J 2/04563* (2013.01); *B41J 2/04566* (2013.01); *B41J 2/04581* (2013.01); *B41J 2002/14491* (2013.01)

(58) Field of Classification Search
CPC ................ B41J 2/14233; B41J 2/04563; B41J 2/04566; B41J 2/04581; B41J 2002/14491
See application file for complete search history.

(56) References Cited

U.S. PATENT DOCUMENTS

| | | | | |
|---|---|---|---|---|
| 6,378,996 | B1 * | 4/2002 | Shimada | B41J 2/14233 347/68 |
| 7,588,307 | B2 * | 9/2009 | Hong | B41J 2/14233 347/17 |
| 7,753,497 | B2 * | 7/2010 | Yagi | B41J 2/14233 29/25.35 |
| 2024/0165947 | A1 | 5/2024 | Takabe et al. | |
| 2024/0165950 | A1 | 5/2024 | Hirai et al. | |
| 2024/0165951 | A1 | 5/2024 | Takabe et al. | |
| 2024/0165963 | A1 | 5/2024 | Mori et al. | |

FOREIGN PATENT DOCUMENTS

| | | |
|---|---|---|
| JP | 2015-033834 A | 2/2015 |
| JP | 2024-073749 A | 5/2024 |
| JP | 2024-073750 A | 5/2024 |
| JP | 2024-073751 A | 5/2024 |
| JP | 2024-073752 A | 5/2024 |

* cited by examiner

*Primary Examiner* — Jason S Uhlenhake
(74) *Attorney, Agent, or Firm* — WORKMAN NYDEGGER

(57) ABSTRACT

A liquid ejecting head includes a piezoelectric element in which a first drive electrode, a piezoelectric body, and a second drive electrode are laminated, a humidity detection unit used for detecting a humidity, which includes a first detection electrode, an interposed layer, and a second detection electrode, and a temperature detection unit used for detecting a temperature, which includes a temperature detection resistor. The piezoelectric body is provided between the temperature detection resistor and the humidity detection unit in a direction of lamination in which the first drive electrode, the piezoelectric body, and the second drive electrode are laminated, and at least one of the first detection electrode, the interposed layer, and the second detection electrode is provided at a position to overlap the temperature detection resistor in the direction of lamination.

10 Claims, 8 Drawing Sheets

LIQUID EJECTING HEAD AND LIQUID EJECTING SYSTEM

The present application is based on, and claims priority from JP Application Serial Number 2023-185255, filed Oct. 30, 2023, the disclosure of which is hereby incorporated by reference herein in its entirety.

BACKGROUND

1. Technical Field

The present disclosure relates to a liquid ejecting head and a liquid ejecting system.

2. Related Art

The has been known a liquid ejecting head including a pressure chamber plate provided with a pressure chamber, a vibration plate that generates a pressure in the pressure chamber, and a piezoelectric actuator provided with a piezoelectric element formed at the vibration plate. For example, JP-A-2015-33834 discloses a configuration in which the piezoelectric actuator is covered with a case unit and a humidity sensor is provided in a space inside the case unit.

There is a case where a temperature sensor is provided in the space inside the case unit in addition to the above-mentioned humidity sensor. However, the liquid ejecting head may be increased in size depending on a positional relationship between the humidity sensor and the temperature sensor.

SUMMARY

According to an aspect of the present disclosure, there is provided a liquid ejecting head. This liquid ejecting head includes a piezoelectric element in which a first drive electrode, a piezoelectric body, and a second drive electrode are laminated, a humidity detection unit used for detecting a humidity which includes a first detection electrode, an interposed layer, and a second detection electrode, and a temperature detection unit used for detecting a temperature which includes a temperature detection resistor. The piezoelectric body is provided between the temperature detection resistor and the humidity detection unit in a direction of lamination in which the first drive electrode, the piezoelectric body, and the second drive electrode are laminated. Moreover, at least one of the first detection electrode, the interposed layer, and the second detection electrode is provided at a position to overlap the temperature detection resistor in the direction of lamination.

DESCRIPTION OF EMBODIMENTS

A. Embodiment 1

Figure 1:
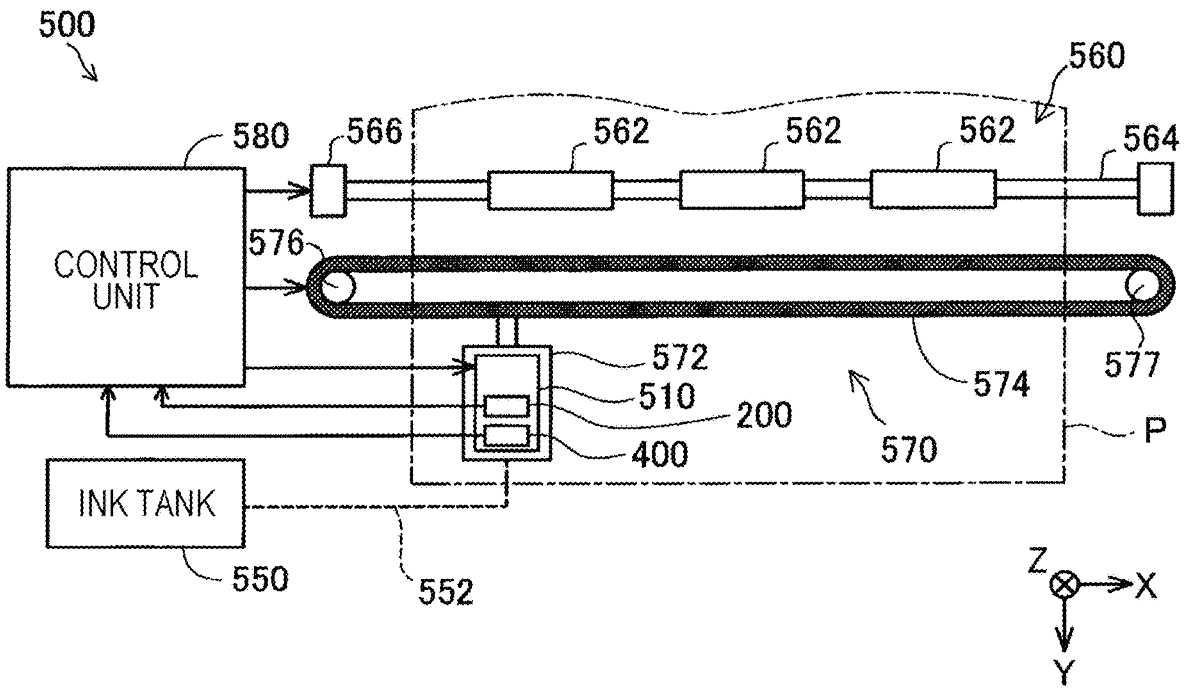
FIG. 1 is an explanatory diagram illustrating a schematic configuration of a liquid ejecting apparatus according to Example 1.

FIG. 1 is an explanatory diagram illustrating a schematic configuration of a liquid ejecting system 500 according to Embodiment 1 of the present disclosure. In the present embodiment, the liquid ejecting system 500 is an ink jet printer which ejects an ink as an example of a liquid onto a print sheet P, thereby forming an image thereon. Here, instead of the print sheet P, the liquid ejecting system 500 may adopt any types of media such as resin films and fabrics as a target of ejection of the ink. Meanwhile, x, y, and z indicated in the respective drawings of FIG. 1 and so on represent three spatial axes that are orthogonal to one another. In the present specification, directions along these axes will also be defined as x axis direction, y axis direction, and z axis direction, respectively. In the case of specifying orientations, a positive direction is indicated as "+" while a negative direction is indicated as "−". Using these positive and negative codes for expressing the directions, a direction to which an arrow is oriented will be explained as + direction and a direction opposite to the arrow will be explained as − direction in each drawing. In the present embodiment, the z axis direction coincides with a vertical direction, and the +z direction indicates vertically downward while the −z direction indicates vertically upward. In addition, in the case of not specifying the positive direction and the negative direction, these three codes x, y, and z will be explained as being the x axis, the y axis, and the z axis, respectively.

The liquid ejecting system 500 includes a liquid ejecting head 510, an ink tank 550, a transportation mechanism 560, a movement mechanism 570, and a control device 580. The liquid ejecting head 510 is provided with multiple nozzles, and is configured to eject, the +z direction, inks of four colors in total, namely, black, cyan, magenta, and yellow, for example, thereby forming an image on the print sheet P. The liquid ejecting head 510 is mounted on a carriage 572, and is reciprocated in a main scanning direction along with movement of the carriage 572. In the present embodiment, the main scanning direction includes +x direction and the −x direction. The liquid ejecting head 510 may eject not only the inks of the four colors but also inks of arbitrary colors such as light cyan, light magenta, clear, and white in addition thereto.

The ink tank 550 contains the inks to be ejected from the liquid ejecting head 510. The ink tank 550 is connected to the liquid ejecting head 510 with tubes 552 made of a resin. The inks in the ink tank 550 are supplied to the liquid ejecting head 510 through the tubes 552. Here, liquid packages each in the form of a bag made of a flexible film may be provided instead of the ink tank 550.

The transportation mechanism 560 transports the print sheet P in a vertical scanning direction. The vertical scanning direction is a direction intersecting with the x axis direction being the main scanning direction, which includes the +y direction and the −y direction in the present embodiment. The transportation mechanism 560 includes a transportation rod 564 to which three transportation rollers 562 are attached, and a transportation motor 566 that rotationally drives the transportation rod 564. The print sheet P is transported in the +y direction being the vertical scanning direction by causing the transportation motor 566 to rotationally drive the transportation rod 564. The number of the transportation rollers 562 is not limited to three but may instead be any arbitrary number. Alternatively, two or more transportation mechanisms 560 may be provided instead.

The movement mechanism 570 includes the carriage 572, a transportation belt 574, a movement motor 576, and a pulley 577. The carriage 572 mounts the liquid ejecting head 510 in the state of being capable of ejecting the inks. The carriage 572 is fixed to the transportation belt 574. The transportation belt 574 is stretched between the movement motor 576 and the pulley 577. The transportation belt 574 is reciprocated in the main scanning direction by rotational drive of the movement motor 576. Accordingly, the carriage 572 fixed to the transportation belt 574 is also reciprocated in the main scanning direction.

Figure 2:
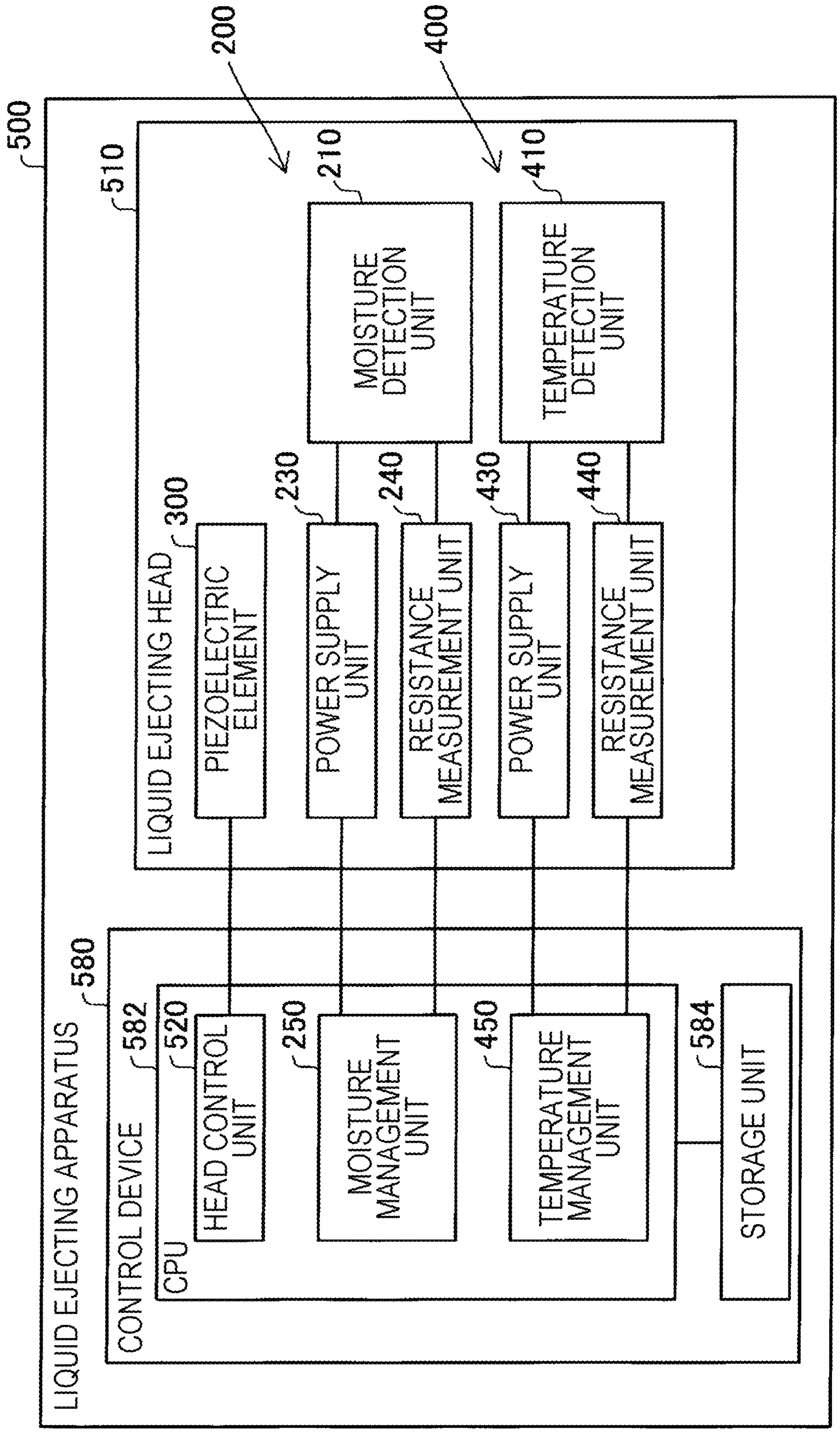
FIG. 2 is a block diagram illustrating a functional configuration of a liquid ejecting system.

FIG. 2 is a block diagram illustrating a functional configuration of the liquid ejecting system 500. FIG. 2 omits illustration of some of the configuration of the liquid ejecting system 500 such as the ink tank 550, the transportation mechanism 560, and the movement mechanism 570. As illustrated in FIG. 2, the liquid ejecting head 510 includes a piezoelectric element 300, a humidity detection mechanism 200, and a temperature detection mechanism 400.

The piezoelectric element 300 is a drive element that generates a change in pressure of the ink in the pressure chamber of the liquid ejecting head 510. The humidity detection mechanism 200 functions as a so-called electrical humidity sensor. As illustrated in FIG. 2, the humidity detection mechanism 200 includes a humidity detection unit 210, a humidity detection power supply unit 230, and a humidity detection resistance measurement unit 240. In the present embodiment, the humidity detection unit 210 is formed from a humidity sensor of a resistance detection type, which uses a behavior of conductivity of a measurement target which changes with moisture absorption. The humidity detection power supply unit 230 is a constant-current circuit, for example, which feeds a predetermined electric current to the humidity detection unit 210 under the control of a humidity management unit 250. The humidity detection resistance measurement unit 240 detects an electrical resistance value of the humidity detection unit 210 based on a current value of the current that the humidity detection power supply unit 230 feeds to the humidity detection unit 210 and on a voltage value of a voltage generated at the humidity detection unit 210. A result of detection by the humidity detection resistance measurement unit 240 is outputted to the humidity management unit 250. Here, the humidity detection power supply unit 230 may be a circuit designed to feed a predetermined voltage to the humidity detection unit 210 instead. The humidity detection power supply unit 230 and the humidity detection resistance measurement unit 240 may be provided to the control device 580 instead.

The temperature detection mechanism 400 functions as a temperature sensor that detects a temperature of the ink in the pressure chamber to be described later. The temperature detection mechanism 400 includes a temperature detection unit 410, a temperature detection power supply unit 430, and a temperature detection resistance measurement unit 440. The temperature detection unit 410 is formed from conductor wiring including a temperature detection resistor. The temperature detection power supply unit 430 is a constant-current circuit, for example, which feeds a predetermined electric current to the temperature detection unit 410 under the control of a temperature management unit 450. The temperature detection resistance measurement unit 440 detects a resistance value of the detection resistor of the temperature detection unit 410 based on a current value of the current that the temperature detection power supply unit 430 feeds to the temperature detection unit 410 and on a voltage value of a voltage generated at the temperature detection unit 410. A result of detection by the temperature detection resistance measurement unit 440 is outputted to the temperature management unit 450.

As illustrated in FIG. 2, the control device 580 is constructed as a microcomputer that includes a CPU 582 and a storage unit 584. The control device 580 is mounted on a wiring substrate 120 or on a circuit substrate being directly or indirectly connected to the wiring substrate 120, for example. The storage unit 584 can adopt a non-volatile memory erasable with an electric signal as typified by an EEPROM, a non-volatile memory erasable with ultraviolet rays as typified by a one-time-PROM and an EPROM, a non-volatile non-erasable memory as typified by a PROM, and so forth. Various programs for implementing functions provided in the present embodiment are stored in the storage unit 584. The CPU 582 functions as a head control unit 520, the humidity management unit 250, and the temperature management unit 450 by deploying and executing the programs stored in the storage unit 584. The control device 580 may further include a communication unit for transmitting and receiving detection results of the humidity and the temperature, and the like to and from a predetermined server.

The head control unit 520 integrates control of respective units of the liquid ejecting head 510 as typified by an ejecting action and the like. For example, the head control unit 520 may control a reciprocating action along the main scanning direction of the carriage 572, and a transporting action along the vertical scanning direction of the print sheet P together with the control of the liquid ejecting head 510. As for the ejecting action of the liquid ejecting head 510, the head control unit 520 can control ejection of the ink to the print sheet P by driving the piezoelectric element 300 while outputting, the liquid ejecting head 510, a drive signal based on the temperature of the ink in the pressure chamber obtained from the temperature management unit 450, for example.

The humidity management unit 250 derives information concerning a humidity of a detection target by using a resistance value of the humidity detection unit 210 obtained from the humidity detection resistance measurement unit 240 and a humidity arithmetic expression stored in the storage unit 584 in advance. The "information concerning the humidity" includes information on an amount of moisture to be adsorbed to or desorbed from a member, a relative humidity and an absolute humidity as an amount of moisture contained in air, a degree of an influence on a performance of the member attributed to moisture absorption or moisture desorption, and the like. The "degree of the influence on the performance of the member" may include presence or absence of a failure of the member, a temporal change in performance of the member, and the like. In the present embodiment, the humidity management unit 250 derives the information concerning a humidity of a sealed space to be described later and outputs the information to the head control unit 520. Here, the humidity management unit 250 may derive not only the information concerning the humidity of the sealed space but also information concerning a humidity of a piezoelectric body 70 to be described later and output the information to the head control unit 520. The humidity arithmetic expression shows a correspondence relation between an electrical resistance value of the detection target and the humidity. A conversion table showing the correspondence relation between the electrical resistance value of the detection target and the humidity may be used instead of the humidity arithmetic expression. Meanwhile, a correspondence relation between the electrical resistance value of the detection target and the temporal change in performance of the detection target may be stored in the storage unit 584. A circuit constituting the humidity management unit 250 may be disposed on the wiring substrate 120, for example. This makes it possible to suppress an increase in size of the liquid ejecting head 510.

The temperature management unit 450 derives a temperature of an ink in a pressure chamber 12 by using an electrical resistance value of the detection resistor of the temperature detection unit 410 obtained from the temperature detection resistance measurement unit 440 and a temperature arithmetic expression stored in the storage unit 584 in advance. The electrical resistance value of the detection resistor varies with the temperature. The temperature arithmetic expression shows a correspondence relation between an electrical resistance value of the temperature detection resistor and the temperature. Specifically, the temperature management unit 450 derives the temperature of the ink in the pressure chamber 12 by using a characteristic that the electric resistance value of the detection resistor varies with the temperature. Here, a conversion table showing the correspondence relation between the electrical resistance value of the temperature detection resistor and the temperature may be used instead of the temperature arithmetic expression. The temperature management unit 450 outputs the derived temperature of the ink in the pressure chamber 12 to the head control unit 520.

Figure 3:
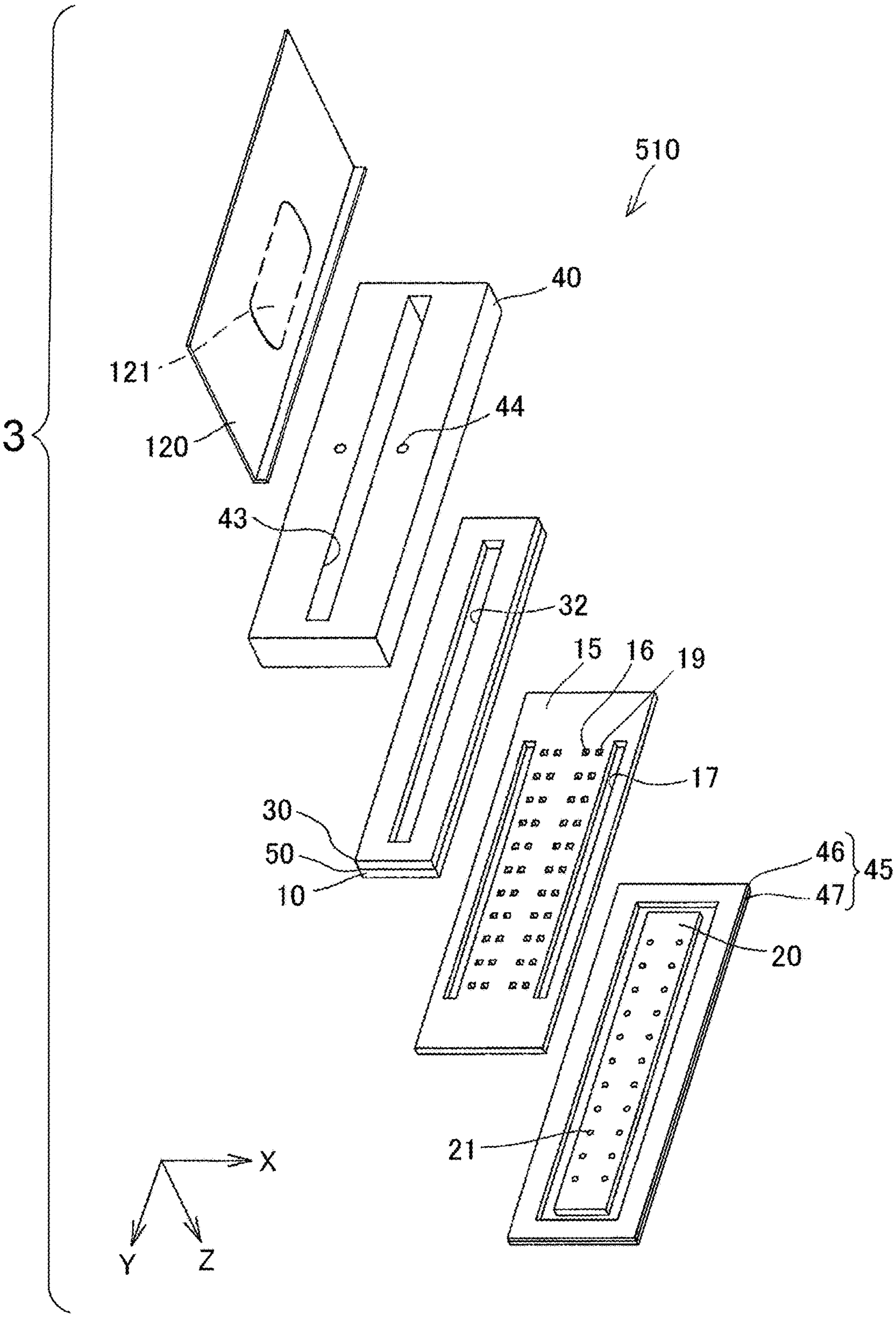
FIG. 3 is an exploded perspective view illustrating a configuration of a liquid ejecting head.
Figure 4:
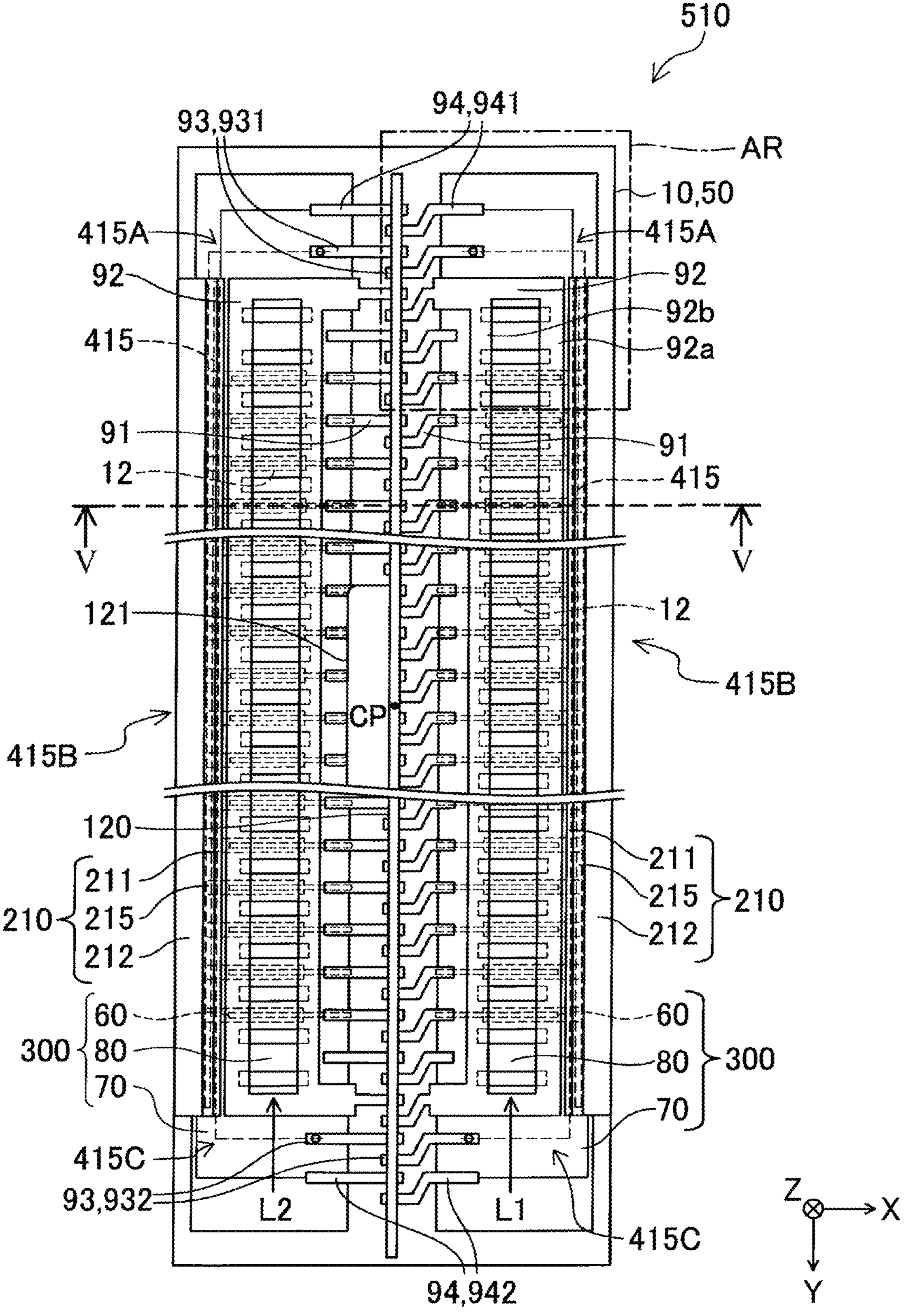
FIG. 4 is an explanatory diagram illustrating the configuration of the liquid ejecting head in plan view.
Figure 5:
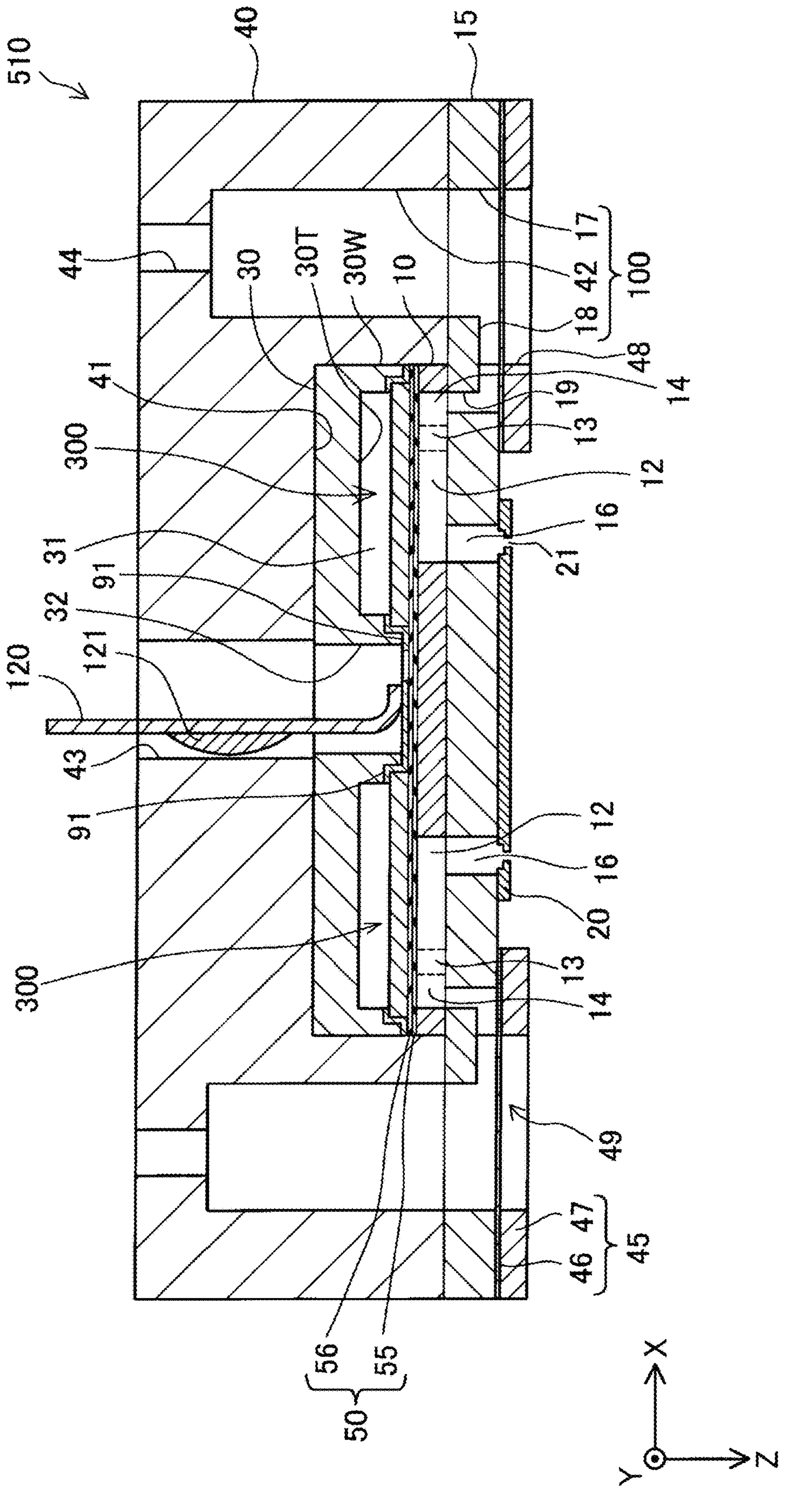
FIG. 5 is a cross-sectional view illustrating the V-V position in FIG. 4.

A detailed configuration of the liquid ejecting head 510 will be described with reference to FIGS. 3 to 5. FIG. 3 is an exploded perspective view illustrating a configuration of the liquid ejecting head 510. FIG. 4 is an explanatory diagram illustrating the configuration of the liquid ejecting head 510 in plan view. In the present disclosure, the "plan view" means a state of an object viewed along a direction of lamination to be described later. FIG. 4 illustrates structures around a pressure chamber substrate 10 and a vibration plate 50 in the liquid ejecting head 510, and illustration of a protection film 82, a sealing substrate 30, a case member 40, and the like is omitted in order to facilitate technical understandings. FIG. 5 is a cross-sectional view illustrating the V-V position in FIG. 4.

The liquid ejecting head 510 includes the pressure chamber substrate 10, a communication plate 15, a nozzle plate 20, a compliance substrate 45, the vibration plate 50, the sealing substrate 30, the case member 40, and the wiring substrate 120 illustrated in FIG. 3, and the piezoelectric elements 300 illustrated in FIG. 4. The liquid ejecting head 510 is formed by laminating these laminated members. In the present disclosure, a direction in which the laminated members that constitute the liquid ejecting head 510 are laminated will also be referred to as the "direction of lamination". In the present embodiment, the direction of lamination coincides with the z axis direction. In the present disclosure, the +z direction side relative to a predetermined reference position will also be referred to as "one side in the direction of lamination" or a "lower side" while the −z direction side thereof will also be referred to as "another side in the direction of lamination" or an "upper side".

For example, the pressure chamber substrate 10 is formed by using any of a silicon substrate, a glass substrate, an SOI substrate, various ceramic substrates, and the like. As illustrated in FIG. 4, the pressure chamber substrate 10 is provided with multiple pressure chambers 12. Ink flow channels as typified by the pressure chambers 12 to be provided to the pressure chamber substrate 10 are formed by subjecting the pressure chamber substrate 10 to anisotropic etching from a surface on the +z direction side thereof. Each pressure chamber 12 is formed substantially into a rectangular shape having a length in the x axis direction is larger than a length in the y axis direction in plan view. However, the shape of the pressure chamber 12 is not limited to the rectangular shape and may be any of a parallelogrammatic shape, a polygonal shape, a circular shape, an oval shape, and the like. The oval shape means a shape based on the rectangular shape with two ends in the longitudinal direction thereof each being formed into a semicircular shape. The oval shape includes a rounded rectangular shape, an elliptical shape, an egg shape, and so forth.

As illustrated in FIG. 4, the pressure chambers 12 are arranged along a predetermined direction in the pressure chamber substrate 10. In plan view of the liquid ejecting head 510 along the direction of lamination, a direction in which the pressure chambers 12 are arranged will also be referred to as a "direction of arrangement". In the present embodiment, the pressure chambers 12 adopt the y axis direction as the direction of arrangement, respectively, and are arranged in two lines that are parallel to each other. In the example of FIG. 4, the pressure chamber substrate 10 is provided with two pressure chamber lines, namely, a first pressure chamber line L1 having a first direction of arrangement being parallel to the y axis direction and a second pressure chamber line L2 having a second direction of arrangement being parallel to the y axis direction. The first pressure chamber line L1 and the second pressure chamber line L2 are disposed on two sizes while interposing the wiring substrate 120 in between. To be more precise, the second pressure chamber line L2 is disposed on an opposite side of the first pressure chamber line L1 while interposing the wiring substrate 120 in between in a direction intersecting the direction of arrangement of the first pressure chamber line L1. A direction orthogonal to both the direction of arrangement and the direction of lamination will also be referred to as a "direction of intersection". In the example of FIG. 4, the direction of intersection is equivalent to the x axis direction, and the second pressure chamber line L2 is disposed in the −x direction relative to the first pressure chamber line L1 while interposing the wiring substrate 120 in between. Regarding the pressure chambers 12, it is not always necessary to arrange all of the pressure chambers 12 linearly. For example, the pressure chambers 12 may be arranged along the y axis direction in two or more lines in accordance with so-called staggered arrangement, in which every other pressure chambers 12 are aligned on different sides in the direction of intersection, for example.

As illustrated in FIG. 3, the communication plate 15, the nozzle plate 20, and the compliance substrate 45 are laminated on the +z direction side of the pressure chamber substrate 10. The communication plate 15 is a flat plate-shaped member that employs any of a silicon substrate, a glass substrate, an SOI substrate, various ceramic substrates, a metal substrate, and the like. Examples of the metal substrate include a stainless steel substrate and the like. The communication plate 15 is provided with nozzle communication channels 16, a first manifold portion 17, a second manifold portion 18 which is illustrated in FIG. 5, and supply communication channels 19. The communication plate 15 preferably adopts a material having substantially the same thermal expansion coefficient as that of the pressure chamber substrate 10. Thus, in case of a change in temperature of the pressure chamber substrate 10 and the communication plate 15, it is possible to suppress warpage of the pressure chamber substrate 10 and the communication plate 15 attributable to a difference in thermal expansion coefficient.

As illustrated in FIG. 5, each nozzle communication channel 16 is a flow channel that establishes communication between the pressure chamber 12 and a nozzle 21. The first manifold portion 17 and the second manifold portion 18 each function as a portion of a manifold 100 that constitutes a common liquid chamber communicating with the pressure chambers 12. The first manifold portion 17 is provided in such a way as to penetrate the communication plate 15 in the z axis direction. Meanwhile, as illustrated in FIG. 5, the second manifold portion 18 is provided on a surface on the +z direction side of the communication plate 15 without penetrating the communication plate 15 in the z axis direction.

As illustrated in FIG. 5, each supply communication channel 19 is a flow channel that is connected to a pressure chamber supply channel 14 provided to the pressure chamber substrate 10. The pressure chamber supply channel 14 is a flow channel connected to one end portion in the x axis direction of the pressure chamber 12 through a narrowed portion 13. The narrowed portion 13 is a flow channel provided between the pressure chamber 12 and the pressure chamber supply channel 14. The narrowed portion 13 is a flow channel with its inner wall projecting from the pressure chamber 12 and the pressure chamber supply channel 14, thereby being formed narrower than the pressure chamber 12 and the pressure chamber supply channel 14. In this way, flow channel resistance of the narrowed portion 13 is higher than flow channel resistance of the pressure chamber 12 and the pressure chamber supply channel 14. By adopting the above-described configuration, even when a pressure is applied from the piezoelectric element 300 to the pressure chamber 12 at the time of ejection of the ink, it is possible to suppress or prevent a backward flow of the ink in the pressure chamber 12 to the pressure chamber supply channel 14. The supply communication channels 19 are arranged along the y axis direction, that is, the direction of arrangement, and are provided one-to-one to the respective pressure chambers 12. The supply communication channels 19 and the pressure chamber supply channels 14 establish communication between the second manifold portion 18 and the respective pressure chambers 12, and supplies the ink in the manifold 100 to the respective pressure chambers 12.

The nozzle plate 20 is provided on a surface on the opposite side of the pressure chamber substrate 10 while interposing the communication plate 15 in between, or in other words, on a surface on the +z direction side of the communication plate 15. A material of the nozzle plate 20 is not limited to a particular material. For example, it is possible to use any of a silicon substrate, a glass substrate, an SOI substrate, various ceramic substrates, a metal substrate, and the like. Examples of the metal substrate include a stainless steel substrate and the like. An organic material such as polyimide can also be used as the material of the nozzle plate 20. However, the nozzle plate 20 preferably adopts a material having substantially the same thermal expansion coefficient as that of the communication plate 15. In this way, in the case of a change in temperature of the nozzle plate 20 and the communication plate 15, it is possible to suppress warpage of the nozzle plate 20 and the communication plate 15 attributable to a difference in thermal expansion coefficient.

The nozzle plate 20 is provided with multiple nozzles 21. Each nozzle 21 communicates with the corresponding pressure chamber 12 through the nozzle communication channel 16. As illustrated in FIG. 3, the nozzles 21 are arranged along the direction of arrangement of the pressure chambers 12, that is, the y axis direction. Two nozzle lines formed by concatenating these nozzles 21 are provided to the nozzle plate 20. The two nozzle lines correspond to the first pressure chamber line L1 and the second pressure chamber line L2, respectively.

As illustrated in FIG. 5, the compliance substrate 45 is provided on the surface on the opposite side of the pressure chamber substrate 10 while interposing the communication plate 15 in between, or in other words, on the surface on the +z direction side of the communication plate 15 together with the nozzle plate 20. The compliance substrate 45 is provided around the nozzle plate 20 and covers openings of the first manifold portion 17 and the second manifold portion 18 which are provided to the communication plate 15. For example, the compliance substrate 45 includes a sealing film 46 formed from a flexible thin film, and a fixation substrate 47 formed from a hard material such as a metal, for example. As illustrated in FIG. 5, a region of the fixation substrate 47 opposed to the manifold 100 is completely removed in the thickness direction, thus defining an opening 48. Accordingly, one surface of the manifold 100 is formed into a compliance unit 49 that is sealed only with the sealing film 46.

As illustrated in FIG. 5, the vibration plate 50 and the piezoelectric elements 300 are laminated on a surface on the opposite side of the communication plate 15 while interposing the pressure chamber substrate 10 in between, or in other words, on a surface on the −z direction side of the pressure chamber substrate 10. Each piezoelectric element 300 flexurally deforms the vibration plate 50, thus generating a change in pressure of the ink in the pressure chamber 12. In FIG. 5, illustration of the piezoelectric element 300 is simplified.

The vibration plate 50 is provided between the piezoelectric elements 300 and the pressure chamber substrate 10. The vibration plate 50 includes an elastic film 55 being provided at a position closer to the pressure chamber substrate 10 side than the piezoelectric elements 300 are and containing silicon oxide ($SiO_2$), and an insulating film 56 being provided on the elastic film 55 and containing a zirconium oxide ($ZrO_2$) film. The elastic film 55 constitutes surfaces on the −z direction side of the flow channels such as the pressure chambers 12. Here, the vibration plate 50 may be formed from one of the elastic film 55 and the insulating film 56. Moreover, the vibration plate 50 may include another film different from the elastic film 55 and the insulating film 56. Examples of a material of the other film include silicon, silicon nitride, and the like.

As illustrated in FIG. 3, the sealing substrate 30 having substantially the same size as that of the pressure chamber substrate 10 in plan view is further joined to the surface on the −z direction side of the pressure chamber substrate 10 by using an adhesive and the like. The sealing substrate 30 may be joined by using the protection film 82 to be described later as the adhesive. As illustrated in FIG. 5, the sealing substrate 30 includes a ceiling portion 30T, wall portions 30W, a holding portion 31, and a through hole 32. The holding portion 31 is a space defined by the ceiling portion 30T and the wall portions 30W, which contains the piezoelectric element 300 and thereby protects an active portion of the piezoelectric element 300. In the present embodiment, the holding portion 31 is provided in such a way as to correspond to each line of the piezoelectric elements 300. To be more precise, two holding portions 31 corresponding to the first pressure chamber line L1 and the second pressure chamber line L2 are formed adjacent to each other. The through hole 32 penetrates the sealing substrate 30 along the z axis direction. The through hole 32 is located between the two holding portions 31 in plan view, and is formed into an elongate rectangular shape along the y axis direction. In the following description, the space formed as the holding portion 31 by being sealed from a space outside the sealing substrate 30 by joining the sealing substrate 30 with the adhesive and the like as described above will also be referred to as the “sealed space”.

As illustrated in FIG. 5, the case member 40 is fixed onto the sealing substrate 30. The case member 40 and the communication plate 15 collectively constitute the manifolds 100 that communicate with the pressure chambers 12. The case member 40 has substantially the same external shape as that of the communication plate 15 in plan view, and is joined in such a way as to cover the sealing substrate 30 and the communication plate 15.

The case member 40 includes a housing portion 41, supply ports 44, third manifold portions 42, and a connection port 43. The housing portion 41 is a space that has such a depth that can house the pressure chamber substrate 10, the vibration plate 50, and the sealing substrate 30. The third manifold portions 42 are spaces formed in the vicinity of two ends in the x axis direction of the housing portion 41, case member 40. Each manifold 100 is formed by connecting the third manifold portion 42 to the first manifold portion 17 and the second manifold portion 18 which are provided to the communication plate 15. Such a manifold 100 has an elongate shape in the y axis direction. The supply ports 44 communicate with the respective manifolds 100 and supply the ink to the manifolds 100. The connection port 43 is a through that communicates with the through hole 32 in the sealing substrate 30, in which the wiring substrate 120 is inserted.

The liquid ejecting head 510 takes in the ink supplied from the ink tank 550 illustrated in FIG. 1 from the supply port 44 illustrated in FIG. 5, fills internal flow channels from the manifold 100 to the nozzles 21 with the ink, and then applies voltages based on drive signals to the respective piezoelectric elements 300 corresponding to the pressure chambers 12. Accordingly, the vibration plates 50 are flexurally deformed together with the piezoelectric elements 300 so as to change volumes of the respective pressure chambers 12 and to increase the pressures in the inside, whereby ink droplets are ejected from the respective nozzles 21.

Figure 6:
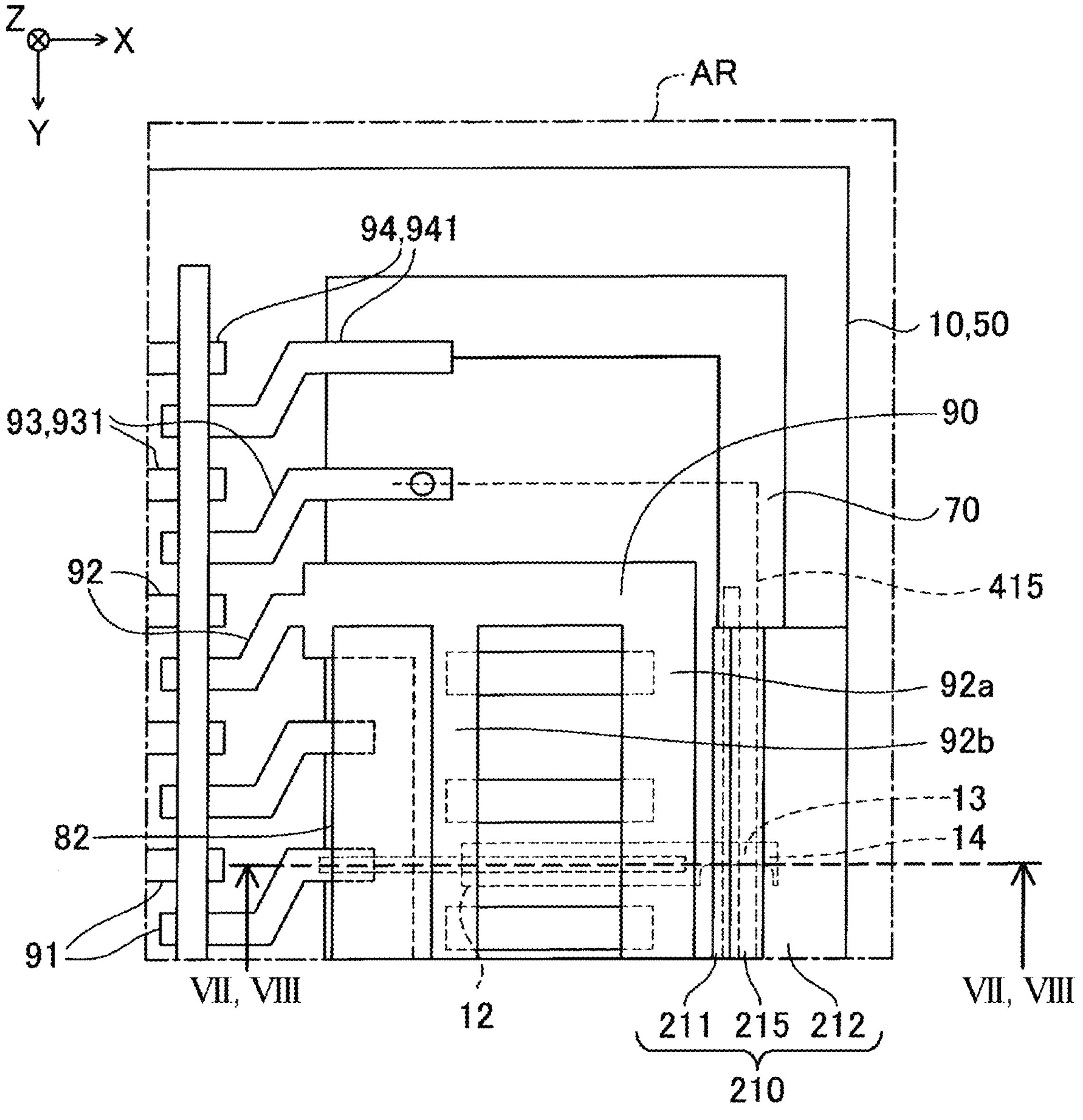
FIG. 6 is an enlarged explanatory diagram illustrating a partial range in FIG. 4.
Figure 7:
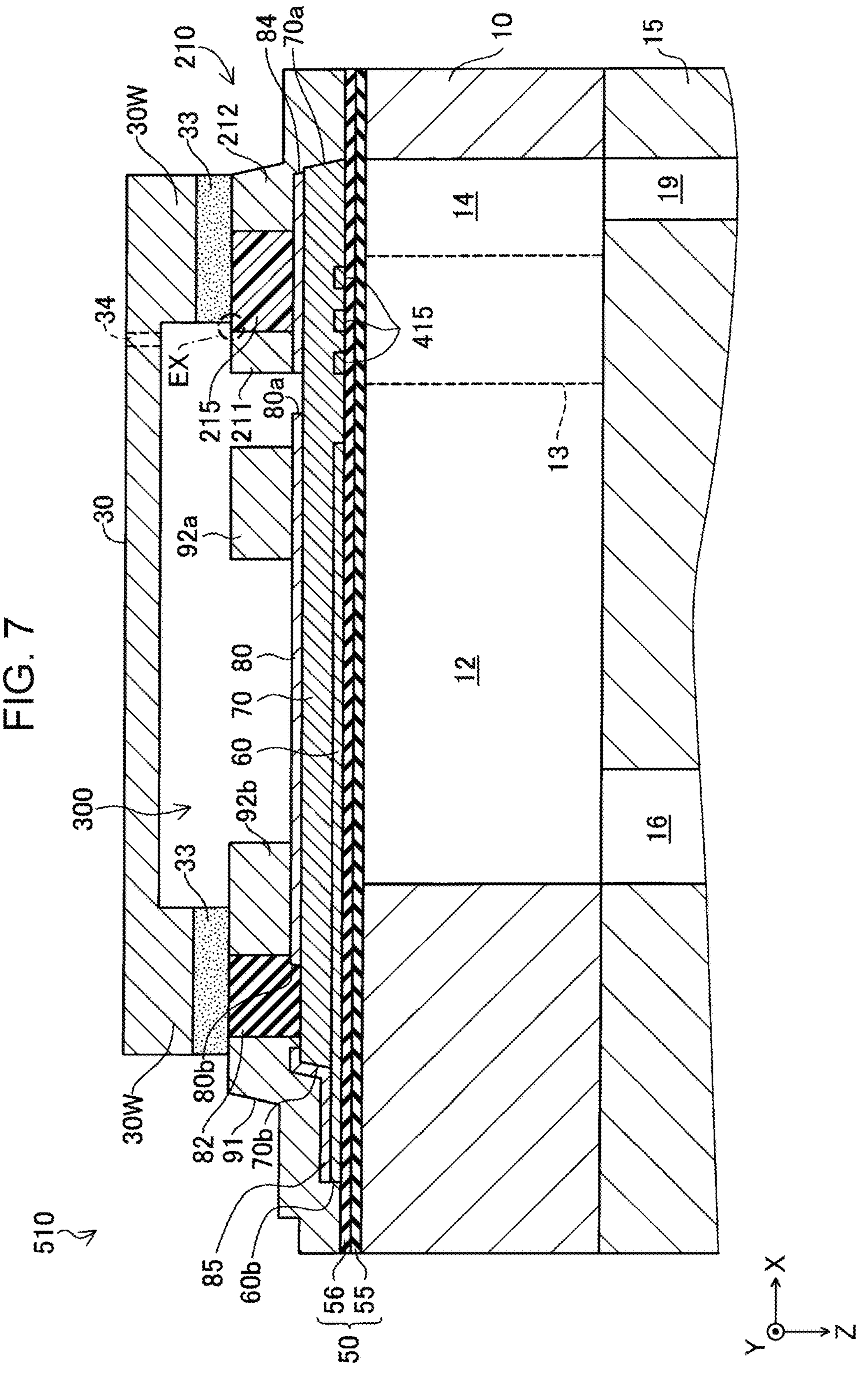
FIG. 7 is a cross-sectional view illustrating the VII-VII position in FIG. 6.

Structures of the piezoelectric element 300, the humidity detection unit 210, and the temperature detection unit 410 will be described with reference to FIGS. 4 and 5 as well as FIGS. 6 and 7 when appropriate. FIG. 6 is an enlarged explanatory diagram illustrating a partial range AR in FIG. 4. FIG. 7 is a cross-sectional view illustrating the VII-VII position in FIG. 6.

As illustrated in FIG. 7, each piezoelectric element 300 includes a first drive electrode 60, the piezoelectric body 70, and a second drive electrode 80. The first drive electrode 60, the piezoelectric body 70, and the second drive electrode 80 are laminated in this order toward the −z direction of the direction of lamination. The piezoelectric body 70 is provided between the first drive electrode 60 and the second drive electrode 80 in the direction of lamination.

As illustrated in FIG. 6, the first drive electrode 60 is electrically connected to the second drive electrode 80 through the wiring substrate 120 illustrated in FIG. 5 and through drive wiring. The drive wiring includes first drive wiring 91 that electrically connects the wiring substrate 120 to the first drive electrode 60, and second drive wiring 92 that electrically connects the wiring substrate 120 to the second drive electrode 80. The first drive electrode 60 and the second drive electrode 80 apply a voltage corresponding to the drive signal to the piezoelectric body 70. A drive voltage is a voltage to be applied from the first drive electrode 60 and the second drive electrode 80 to the piezoelectric element 300 by the head control unit 520 in order to drive the piezoelectric element 300. Of the piezoelectric element 300, a portion where a piezoelectric strain occurs in the piezoelectric body 70 when the voltage is applied between the first drive electrode 60 and the second drive electrode 80 will also be referred to as an active portion.

Different drive voltages are applied to the first drive electrode 60 depending on amounts of ejection of the ink whereas a predetermined reference voltage is applied to the second drive electrode 80 irrespective of the amounts of ejection of the ink. The piezoelectric body 70 of the piezoelectric element 300 is deformed when a difference in voltage occurs between the first drive electrode 60 and the second drive electrode 80 as a consequence of application of the drive voltage and the reference voltage. Due to the deformation of the piezoelectric body 70, the vibration plate 50 is either deformed or vibrated so as to change the volume of the pressure chamber 12. As a consequence of a change in volume of the pressure chamber 12, a pressure is applied to the ink contained in the pressure chamber 12 whereby the ink is ejected from the nozzle 21 through the nozzle communication channel 16.

In the present embodiment, the first drive electrode 60 is an individual electrode which is individually provided to each of the pressure chambers 12. As illustrated in FIG. 7, the first drive electrode 60 is a lower electrode which is provided on the opposite side to the second drive electrode 80 while interposing the piezoelectric body 70 in between, that is to say, on a lower side of the piezoelectric body 70. The first drive electrode 60 is formed in a thickness of about 80 nm, for example. The first drive electrode 60 is formed from a conductive material such as a metal as typified by platinum (Pt), iridium (Ir), gold (Au), titanium (Ti), and the like, and a conductive metal oxide as typified by indium tin oxide abbreviated as ITO. The first drive electrode 60 may be formed by laminating two or more materials out of platinum (Pt), iridium (Ir), gold (Au), titanium (Ti), and the like. In the present embodiment, platinum (Pt) is used as the first drive electrode 60.

As illustrated in FIG. 4, the piezoelectric body 70 has a predetermined width in the x axis direction and has a rectangular shape that is elongate in the direction of arrangement of the pressure chambers 12, that is to say, along the y axis direction. The piezoelectric body 70 is formed in a thickness in a range from about 1000 nm to 4000 nm, for example. A crystalline film having a perovskite structure which is formed on the first drive electrode 60 and made of a ferroelectric ceramic material that exhibits an electromechanical transduction behavior, or so-called a perovskite-type crystal is cited as a typical piezoelectric body 70. For example, a ferroelectric piezoelectric material such as lead zirconate titanate (PZT) and PZT with the addition of a metal oxide such as niobium oxide, nickel oxide, and magnesium oxide, or the like can be used as a material of the piezoelectric body 70. To be more precise, it is possible to use lead titanate ($PbTiO_3$), lead zirconate titanate ($Pb(Zr,Ti)O_3$), lead zirconate ($PbZrO_3$), lead lanthanum titanate ((Pb, La),$TiO_3$), lead lanthanum zirconate titanate (((Pb,La)(Zr,Ti)$O_3$), lead magnesium niobate zirconium titanate (Pb(Zr,Ti)(Mg,Nb)$O_3$), and the like. In the present embodiment, lead zirconate titanate (PZT) is used as the piezoelectric body 70.

The material of the piezoelectric body 70 is not limited to the lead-based piezoelectric materials containing lead, and non-lead-based piezoelectric materials not containing lead can also be used. Examples of the non-lead-based piezoelectric materials include bismuth ferrate (($BiFeO_3$), abbreviated as "BFO"), barium titanate (($BaTiO_3$), abbreviated as "BT"), potassium sodium niobate ((K,Na)($NbO_3$), abbreviated as "KNN"), potassium sodium lithium niobate ((K,Na,Li)($NbO_3$)), potassium sodium lithium niobate tantalate ((K,Na,Li)(Nb,Ta)$O_3$), bismuth potassium titanate (($Bi_{1/2}K_{1/2}$)$TiO_3$, abbreviated as "BKT"), bismuth sodium titanate (($Bi_{1/2}Na_{1/2}$)$TiO_3$, abbreviated as "BNT"), bismuth manganite ($BiMnO_3$, abbreviated as "BM"), a composite oxide containing bismuth, potassium, titanium, and iron and having the perovskite structure (x[($Bi_xK_{1-x}$)$TiO_3$]-(1−x)[$BiFeO_3$], abbreviated as "BKT-BF"), a composite oxide containing bismuth, iron, barium, and titanium and having the perovskite structure ((1−x)[$BiFeO_3$]-x[($BaTiO_3$], abbreviated as "BFO-BT"), BFO-BT with the addition of a metal such as manganese, cobalt, and chromium ((1−x)[Bi($Fe_{1-y}My$)$O_3$]-x[($BaTiO_3$], (where M is any of Mn, Co, and Cr)), and so forth.

As illustrated in FIG. 4, the second drive electrode 80 is a common electrode which is provided in common to the pressure chambers 12. The second drive electrode 80 is provided in such a way as to have a predetermined width in the x axis direction and to be extended along the direction of arrangement of the pressure chambers 12, namely, the y axis direction. As illustrated in FIG. 7, the second drive electrode 80 is an upper electrode which is provided on the opposite side to the first drive electrode 60 while interposing the piezoelectric body 70 in between, that is to say, on an upper side of the piezoelectric body 70. As with the first drive electrode 60, a conductive material such as a metal as typified by platinum (Pt), iridium (Ir), gold (Au), titanium (Ti), and the like, and a conductive metal oxide as typified by indium tin oxide abbreviated as ITO is used as a material of the second drive electrode 80. The second drive electrode 80 may be formed by laminating two or more materials out of platinum (Pt), iridium (Ir), gold (Au), titanium (Ti), and the like. In the present embodiment, iridium (Ir) is used as the second drive electrode 80.

As illustrated in FIG. 7, the 82 is formed at one end portion 80*b* on the −x direction side of the second drive electrode 80. A material having an electrical insulation property and a moisture barrier property is used as a material of the protection film 82. The protection film 82 can adopt an oxide insulating film such as aluminum oxide and hafnia, a polymer material film such as polyimide, and the like. When the protection film 82 is made of a photosensitive resin such as polyimide, it is possible to employ a resist layer that is used in a manufacturing process. In the present embodiment, polyimide is used for the protection film 82.

As illustrated in FIG. 6, the protection film 82 is disposed at a drive electrode end portion position that overlaps an end portion of the second drive electrode 80 in plan view of the liquid ejecting head 510, and is formed in such a way as to cover surfaces of the one end portion 80*b* of the second drive electrode 80 and of the piezoelectric body 70 as illustrated in FIG. 7. The protection film 82 can protect the piezoelectric body 70 against moisture in atmosphere and in the air by covering the surface of the piezoelectric body 70. For this reason, the protection film 82 is preferably formed from a material having low water vapor permeability. Meanwhile, the protection film 82 can suppress or prevent detachment of the one end portion 80*b* of the second drive electrode 80 by covering the one end portion 80*b*. Moreover, it is possible to suppress the drive of the piezoelectric element 300 in the vicinity of an end portion of the active portion of the piezoelectric element 300 by covering the one end portion 80*b*. As a consequence, it is possible to suppress the occurrence of physical damage such as cracks on a member in the vicinity of an end portion of the active portion such as the vibration plate 50 and a junction between the vibration plate 50 and the pressure chamber substrate 10. In this regard, the protection film 82 is preferably formed from a material having a large elastic modulus or a large Young's modulus, for example. For instance, the Young's modulus is preferably equal to or above 2 GPa from the viewpoint of favorably suppressing the drive. Meanwhile, provision of the protection film 82 with the insulation property makes it possible to suppress or prevent progression of migration between the one end portion 80*b* and wiring such as the first drive wiring 91. In the case where the second drive electrode 80 is disposed on the lower side of the piezoelectric body 70 as the lower electrode and the first drive electrode 60 is disposed on the upper side of the piezoelectric body 70 as the upper electrode, the drive electrode end portion position means a position to overlap an end portion on the −x direction side of the first drive electrode 60. However, the drive electrode end portion position is not limited to the end portion on the −x direction side of the first drive electrode 60, and may be set by using an end portion located in any one of directions of the first drive electrode 60 or the second drive electrode 80 or a combination of any of these end portions.

As illustrated in FIG. 7, a wiring portion 85 is provided further on the −x direction side relative to the one end portion 80*b* in the −x direction of the second drive electrode 80. Note that illustration of the wiring portion 85 is omitted in FIGS. 4 and 6. The wiring portion 85 is located on the same layer as the second drive electrode 80 but is electrically discontinuous with the second drive electrode 80. The wiring portion 85 is formed across a range from one end portion 70*b* in the −x direction of the piezoelectric body 70 to one end portion 60*b* in the −x direction of the first drive electrode 60 in a state of being provided with an interval from the one end portion 80*b* of the second drive electrode 80. The one end portion 60*b* in the −x direction of the first drive electrode 60 is extracted to a further outer side relative to the one end portion 70*b* of the piezoelectric body 70. Such wiring portions 85 are provided one-to-one to the piezoelectric elements 300 and are disposed at predetermined intervals along the y axis direction. Each wiring portion 85 is preferably formed on the same layer as the second drive electrode 80. Accordingly, it is possible to simplify a manufacturing process of the wiring portion 85 and to reduce costs. Nonetheless, the wiring portion 85 may be formed on a different layer from that of the second drive electrode 80 instead.

As illustrated in FIGS. 6 and 7, the first drive wiring 91 is electrically connected to the first drive electrode 60 being the individual electrode, while an extended portion 92*a* and an extended portion 92*b* of the second drive wiring 92 are electrically connected to the second drive electrode 80 being the common electrode. Each of the first drive wiring 91 and the second drive wiring 92 functions as the drive wiring for applying the voltage for driving the piezoelectric body 70 from the wiring substrate 120.

A material of each of the first drive wiring 91 and the second drive wiring 92 is a conductive material. For example, it is possible to use any of gold (Au), copper (Cu), titanium (Ti), tungsten (W), nickel (Ni), chromium (Cr), platinum (Pt), aluminum (Al), and the like as the material. In the present embodiment, the gold (Au) is used as the first drive wiring 91 and the second drive wiring 92. In the present embodiment, each of the first drive wiring 91 and the second drive wiring 92 is formed by sputtering. Note that the first drive wiring 91 and the second drive wiring 92 may be formed not only by sputtering but also by any of arbitrary publicly known film forming techniques.

Each of the first drive wiring 91 and the second drive wiring 92 is formed on the same layer in the state of being electrically discontinuous with each other. In this way, it is possible to unify a forming process of the first drive wiring 91 and the second drive wiring 92, so that the manufacturing process can be simplified while suppressing reduction in productivity of the liquid ejecting head 510 as compared to a case of individually forming the first drive wiring 91 and the second drive wiring 92. Nonetheless, the first drive wiring 91 and the second drive wiring 92 may be formed on different layers from each other instead. Each of the first drive wiring 91 and the second drive wiring 92 may include an adhesion layer that improves adhesiveness to the first drive electrode 60, the second drive electrode 80, and the vibration plate 50.

The first drive wiring 91 is individually provided to each first drive electrode 60. As illustrated in FIG. 7, the first drive wiring 91 is connected to the neighborhood of the one end portion 60*b* of the first drive electrode 60 through the wiring portion 85, and extracted in the −x direction onto the vibration plate 50. The first drive wiring 91 is electrically connected to the one end portion 60*b* in the −x direction of the first drive electrode 60 which is extracted to the further outer side relative to the one end portion 70*b* of the piezoelectric body 70. Instead, the first drive wiring 91 may be directly connected to the one end portion 60*b* of the first drive electrode 60 while omitting the wiring portion 85.

As illustrated in FIG. 4, the second drive wiring 92 is extended along the y axis direction, and is bent at two ends in the y axis direction and then extracted along the x axis direction. The second drive wiring 92 includes the extended portion 92*a* and the extended portion 92*b*, which are extended along the y axis direction. As illustrated in FIGS. 4 and 5, end portions of the first drive wiring 91 and the second drive wiring 92 are extended in such a way as to be exposed to the through hole 32 of the sealing substrate 30, and are electrically connected to the wiring substrate 120 in the through hole 32.

The wiring substrate 120 is formed from a flexible printed circuit (FPC) substrate, for example. The wiring substrate 120 is provided with multiple sets of wiring to be connected to the control device 580 and to a not-illustrated power supply circuit. Here, the wiring substrate 120 may be formed from an arbitrary substrate having flexibility such as a flexible flat cable (FFC) substrate instead of the FPC substrate. An integrated circuit 121 provided with switching elements and the like is mounted on the wiring substrate 120. Instruction signals for driving the piezoelectric elements 300, and the like are inputted to the integrated circuit 121. Based on such an instruction signal, the integrated circuit 121 controls timing to supply the drive signal for driving each piezoelectric element 300 to the first drive electrode 60.

As illustrated in FIG. 6, the temperature detection unit 410 includes a temperature detection resistor 415 and temperature detection wiring 93. The temperature detection resistor 415 is resistance wiring used for detecting the temperature of the ink in the pressure chamber 12. The temperature detection wiring 93 electrically connects the wiring substrate 120 to the temperature detection resistor 415. To be more precise, the temperature detection wiring 93 includes first temperature detection wiring 931 connected to one end of the temperature detection resistor 415 and second temperature detection wiring 932 connected to another end of the temperature detection resistor 415. For example, the temperature detection wiring 93 is formed on the same layer as the first drive wiring 91, the second drive wiring 92, and humidity detection wiring 94 to be described later in such a way as to be electrically discontinuous with one another. An end portion of the temperature detection wiring 93 is extended in such a way as to be exposed to the through hole 32 of the sealing substrate 30, and is electrically connected to the wiring substrate 120 in the through hole 32.

A material of the temperature detection resistor 415 is a material with its electrical resistance value having a temperature dependency, and any of gold (Au), platinum (Pt), iridium (Ir), aluminum (Al), copper (Cu), titanium (Ti), tungsten (W), nickel (Ni), chromium (Cr), and the like can be used, for example. Among them, platinum (Pt) has a large variation in electrical resistance with the temperature as well as high stability and accuracy, and is suitable for the material of the temperature detection resistor 415 from this point of view.

As illustrated in FIG. 7, the temperature detection resistor 415 is formed on the same layer as the first drive electrode 60 in the direction of lamination, for example, and in such a way as to be electrically discontinuous with the first drive electrode 60. In the present embodiment, the temperature detection resistor 415 is formed from platinum (Pt) which is the same material as that of the first drive electrode 60. For this reason, it is possible to form the temperature detection resistor 415 together with the first drive electrode 60 in a forming process of the first drive electrode 60, so that reduction in productivity of the liquid ejecting head 510 can be suppressed. As a consequence, a thickness of the temperature detection resistor 415 is around 80 nm as with the first drive electrode 60. However, without limitation to the foregoing, the temperature detection resistor 415 may be formed individually apart from the forming process of the first drive electrode 60, or may be formed together with conductor wiring other than the first drive electrode 60.

A material of the temperature detection wiring 93 is a conductive material such as gold (Au), copper (Cu), titanium (Ti), tungsten (W), nickel (Ni), chromium (Cr), platinum (Pt), and aluminum (Al). The material of the temperature detection wiring 93 is gold (Au) which is the same as the first drive wiring 91, the second drive wiring 92, and the humidity detection wiring 94 to be described later. However, the temperature detection wiring 93 may adopt an arbitrary material other than gold (Au) or a material different from that of the first drive wiring 91, the second drive wiring 92, or the humidity detection wiring 94.

As illustrated in FIG. 4, in the present embodiment, the temperature detection resistor 415 is continuously formed in such a way as to surround the first pressure chamber line L1 and the second pressure chamber line L2 in plan view. To be more precise, the temperature detection resistor 415 includes a first extended portion 415A electrically connected to the first temperature detection wiring 931, a third extended portion 415C electrically connected to the second temperature detection wiring 932, and a second extended portion 415B located between the first extended portion 415A and the third extended portion 415C. A region surrounded by the first extended portion 415A, the second extended portion 415B, and the third extended portion 415C will also be referred to as a "temperature detection region". In the example of FIG. 4, there are provided two temperature detection regions, namely, a first temperature detection region that incorporates the first pressure chamber line L1 and a second temperature detection region that incorporates the second pressure chamber line L2.

The first extended portion 415A is disposed on one side in the direction of arrangement relative to the pressure chambers 12, or on the −y direction side to be more precise, and is extended along the x axis direction being the direction of intersection. The second extended portion 415B is disposed on an outer side of the liquid ejecting head 510 relative to the first pressure chamber line L1 and the second pressure chamber line L2, and is extended along the y axis direction being the direction of arrangement. The third extended portion 415C is disposed on the other side in the direction of arrangement relative to the pressure chambers 12, or at a position on the +y direction side to be more precise, and is extended along the x axis direction. As described above, the temperature detection resistor 415 is disposed in such a way as to surround the first pressure chamber line L1 and the second pressure chamber line L2. The temperature of the ink in the entire liquid ejecting head 510 can be detected by widening the region to dispose the temperature detection resistor 415.

As illustrated in FIGS. 6 and 7, the temperature detection resistor 415 is disposed in such a way as to pass through the neighborhood of the ink flow channels in the pressure chamber substrate 10. In the present embodiment, the second extended portion 415B of the temperature detection resistor 415 is disposed in such a way as to pass above the narrowed portions 13 in the vicinity of the respective pressure chambers 12. Meanwhile, as illustrated in FIG. 4, the second extended portion 415B is formed into a so-called meandering pattern that is reciprocated multiple times along the direction of arrangement. It is possible to improve detection accuracy of the temperature of the ink in the pressure chambers 12 by increasing a wiring length at a portion of the temperature detection resistor 415 that passes the neighborhood of the pressure chambers 12 and is likely to contribute to the temperature detection of the ink. Nonetheless, the second extended portion 415B may be formed into an arbitrary shape. The second extended portion 415B may be formed into a meandering pattern that is reciprocated multiple times along the direction of intersection instead of the direction of arrangement, for example, or may be formed into an arbitrary shape such as a linear shape or a corrugated shape instead of the meandering pattern, for example. Meanwhile, the position to dispose the temperature detection resistor 415 is not limited to the position above the narrowed portions 13, and may be an arbitrary position on the pressure chambers 12 or a position near the pressure chambers 12 when it is not possible to dispose the temperature detection resistor 415 on the pressure chambers 12.

As illustrated in FIG. 4, the humidity detection units 210 are disposed on outer sides of the pressure chamber substrate 10 along a direction orthogonal to the first direction of arrangement and the second direction of arrangement in plan view, respectively. In other words, the pair of humidity detection units 210 are disposed in such a way as to interpose the first pressure chamber line L1 and the second pressure chamber line L2 therebetween. Each humidity detection unit 210 is provided such that at least a portion of the humidity detection unit 210 comes into contact with the sealed space. Information concerning the humidity in the respective pressure chamber lines can be accurately obtained by individually providing the humidity detection units 210 to the sealed space corresponding to the first pressure chamber line L1 and the sealed space corresponding to the second pressure chamber line L2, respectively. The humidity detection units 210 are disposed at the two end portions on two sides along the direction orthogonal to the first direction of arrangement and the second direction of arrangement, respectively. This configuration makes it possible to dispose the humidity detection units 210 easily in such a way as to come into contact with the sealed spaces, and thus to suppress an increase in size of the liquid ejecting head 510 along the direction of arrangement. Meanwhile, when the wiring substrate 120 is provided with the humidity management unit 250 or the like as an IC chip, routing of the conductor wiring on the wiring substrate 120 is facilitated.

Each humidity detection unit 210 includes the humidity detection wiring 94, a first detection electrode 211, a second detection electrode 212, and an interposed layer 215. Although the humidity detection wiring 94 is not included in the humidity detection unit 210 in FIG. 4 for the convenience of illustration, the humidity detection unit 210 indeed includes the humidity detection wiring 94. As illustrated in FIG. 4, the first detection electrode 211 and the second detection electrode 212 are disposed along the y direction, respectively, in parallel to each other and at a predetermined distance away from each other in the x direction so as to be electrically discontinuous. Here, although detailed illustration regarding the shapes of the first detection electrode 211 and the second detection electrode 212 is omitted, each of the first detection electrode 211 and the second detection electrode 212 may take on an arbitrary shape such as a linear shape, a flat plate shape, and a comb shape.

The first detection electrode 211 and the second detection electrode 212 can be formed from an arbitrary conductive material including a metal such as platinum (Pt), iridium (Ir), gold (Au), and titanium (Ti), and a conductive metal oxide such as indium tin oxide abbreviated as ITO, for example. The first detection electrode 211 and the second detection electrode 212 may be formed by laminating two or more materials out of platinum (Pt), iridium (Ir), gold (Au), titanium (Ti), and the like. Note that the first detection electrode 211 and the second detection electrode 212 may be formed from the same material or different materials from each other.

In the present embodiment, the first detection electrode 211 and the second detection electrode 212 are formed by using iridium (Ir) as the same as the second drive electrode 80. In this way, it is possible to unify a forming process of the first detection electrode 211 and the second detection electrode 212 and a forming process of the second drive electrode 80, so that the reduction in productivity of the liquid ejecting head 510 can be suppressed. In the meantime, any of gold (Au), copper (Cu), titanium (Ti), tungsten (W), nickel (Ni), chromium (Cr), platinum (Pt), aluminum (Al), and the like can also be used for the first detection electrode 211 and the second detection electrode 212, for example. Hence, it is also possible to unify the material of the first detection electrode 211 as well as the second detection electrode 212 and the material of the first drive wiring 91, the second drive wiring 92, the temperature detection wiring 93, and the humidity detection wiring 94. As for an example of the order of procedures in the case of unifying the forming process of the first detection electrode 211 as well as the second detection electrode 212 and the forming process of the second drive electrode 80, the interposed layer 215 is formed to begin with, then the first detection electrode 211, the second detection electrode 212, and the second drive electrode 80 are formed in the same process, and then the protection film 82 is formed at the drive electrode end portion position. Here, the first detection electrode 211 and the second detection electrode 212 may be formed by using a different material from that of the second drive electrode 80 or formed in a different process from that for the second drive electrode 80.

The interposed layer 215 is formed between the first detection electrode 211 and the second detection electrode 212. The interposed layer 215 is formed in such a way as to come into contact with the first detection electrode 211 and the second detection electrode 212, respectively, such that the current from the humidity detection power supply unit 230 being the constant-current circuit flows on the interposed layer 215. Here, the state in which "the current flows on the interposed layer 215" means that the current flows inside the interposed layer 215 that is formed between the first detection electrode 211 and the second detection electrode 212. Here, this state may also include a state in which the current flows on a surface of the interposed layer 215 and on an interface between the interposed layer 215 and another layer. In the present embodiment, it is possible to manage a temporal change in the state of moisture absorption of the protection film 82 and to manage a temporal change in performance of the protection film 82 attributed to the humidity by detecting electrical resistance of a current flowing on the protection film 82. Here, the interposed layer 215 may be doped with a metal such as chromium (Cr) by means of ion implantation, so as to cause the current for detecting the humidity to flow easily.

The interposed layer 215 is a humidity detection target and is formed from a material that changes electrical resistance depending on the humidity. Of the members constituting the liquid ejecting head 510, a member laminated on at least one of the piezoelectric body 70, the vibration plate 50, and the pressure chamber substrate 10 as the member that is susceptible to the temperature and likely to degrade its performance at the piezoelectric element 300 or in the vicinity thereof can be adopted as the interposed layer 215. The interposed layer 215 is formed by using a material having a higher water absorption rate than that of the protection film 82. The "water absorption rate" is identified, for example, by exposing a sample of the member of an analysis target to heavy water and performing a quantitative analysis of an amount of the heavy water penetrating the sample in accordance with an elemental analysis method such as secondary ion mass spectroscopy (SIMS evaluation). In the present embodiment, the interposed layer 215 is formed from epoxy resin and the water absorption rate of the interposed layer 215 is equal to or below 1.8%.

The protection film 82 may be deteriorated by moisture absorption under a highly humid environment, and may thereby degrade its performance in some cases. As illustrated in FIG. 7, in the present embodiment, an adhesive 33 to be described layer is present between the protection film 82 and the sealed space whereby the protection film 82 is not in direct contact with the sealed space. However, the moisture that exits in the sealed space is absorbed by the adhesive 33 and the adhesive 33 having absorbed the moisture is in contact with the protection film 82. Accordingly, the protection film 82 may possibly absorb the moisture existing in the sealed space by way of the adhesive 33. Meanwhile, the piezoelectric element 300 may degrade its performance due to adhesion of the moisture that is absorbed by the protection film 82. By using the material having the higher water absorption rate than that of the protection film 82 as the interposed layer 215, the moisture is preferentially absorbed by the interposed layer 215 as compared to the protection film 82. Accordingly, the moisture is absorbed by the protection film 82, so that degradations in performance of the protection film 82 and the piezoelectric element 300 can be suppressed.

As illustrated in FIG. 7, a portion of the second detection electrode 212, the first detection electrode 211, and the interposed layer 215 are formed on the piezoelectric body 70 while interposing an intermediate layer 84 therebetween. In the present embodiment, the intermediate layer 84 is formed on the same layer as the second drive electrode 80 in a state of being provided with a clearance from another end portion 80*a* being an end portion in the +x direction of the second drive electrode 80 so as to be electrically discontinuous with second drive electrode 80. Here, although illustration is omitted in FIG. 7, a protective film formed from the same material as that of the protection film 82 may be provided between the second drive electrode 80 and the intermediate layer 84. The intermediate layer 84 is formed from the same material as that of the second drive electrode 80 and in the same thickness as that of the second drive electrode 80. Formation of at least a portion of the second detection electrode 212, the first detection electrode 211, and the interposed layer 215 on the piezoelectric body 70 while interposing the above-described intermediate layer 84 therebetween makes it possible to suppress reduction in adhesiveness of the second detection electrode 212, the first detection electrode 211, and the interposed layer 215 to the piezoelectric body 70 as compared to a configuration to form these constituents directly on the piezoelectric body 70. Here, the second detection electrode 212, the first detection electrode 211, and the interposed layer 215 may be formed on the piezoelectric body 70 or on the vibration plate 50 instead.

In the present embodiment, the humidity detection unit 210 is provided in such a way as to locate the piezoelectric body 70 between the humidity detection unit 210 and the temperature detection resistor 415 in the direction of lamination. Thus, the humidity detection unit 210 and the temperature detection resistor 415 are separated from each other by using the piezoelectric body 70. Accordingly, electrical conduction between the humidity detection unit 210 and the temperature detection resistor 415 can be suppressed. As a consequence, it is possible to suppress the occurrence of a failure in detecting the humidity and in detecting the temperature.

As illustrated in FIG. 4, in the present embodiment, the first drive electrode 60, the temperature detection resistor 415, and the second detection electrode 212 are provided in this order from an inner side toward an outer side of the liquid ejecting head 510 along the x direction in plan view of the liquid ejecting head 510 along the direction of lamination. Meanwhile, as illustrated in FIG. 7, the first detection electrode 211 and the interposed layer 215 in the humidity detection unit 210 are provided at positions to overlap the temperature detection resistor 415 in the direction of lamination. Here, the state of being "provided at positions to overlap" means a state of being provided at such positions where the first detection electrode 211 and the interposed layer 215 are deemed to overlap the temperature detection resistor 415 in plan view of the liquid ejecting head 510 along the direction of lamination. Accordingly, it is possible to suppress an increase in size along the x direction of the liquid ejecting head 510 as compared to a configuration in which the first detection electrode 211 and the interposed layer 215 are located in the +x direction relative to the temperature detection resistor 415 and none of the first detection electrode 211 and the interposed layer 215 overlap the temperature detection resistor 415. Meanwhile, it is possible to dispose the first detection electrode 211, the interposed layer 215, and the temperature detection resistor 415 to come close to one another as compared to the configuration in which none of the first detection electrode 211 and the interposed layer 215 overlap the temperature detection resistor 415. Accordingly, it is possible to suppress a difference between a detecting position of the humidity and a detecting position of the temperature, so that the humidity can be calculated more accurately in the case of using the temperature for calculation of the humidity. Moreover, since the humidity can be calculated more accurately, it is possible to execute the control of the ejecting action more appropriately when determination is executed by using the humidity in the course of the control of the ejecting action by the head control unit 520.

A lower end portion of one of the wall portions 30W of the sealing substrate 30 is attached to upper end portions of the first drive wiring 91, the protection film 82, and the second drive wiring 92 by using the adhesive 33. Meanwhile, a lower end surface of the other wall portion 30W of the sealing substrate 30 is attached to upper end surfaces of the interposed layer 215 and the second detection electrode 212 by using the adhesive 33. To be more precise, the sealing substrate 30 is attached to the first drive wiring 91, the protection film 82, and the second drive wiring 92 as well as to the interposed layer 215 and the second detection electrode 212 by using the adhesive 33 so as to define the above-described sealed space. In the above description, an "upper end surface" means an end surface in the −z direction while a "lower end surface" means an end surface in the +z direction.

In the present embodiment, a water absorption rate of the adhesive 33 is higher than the water absorption rates of the protection film 82 and the interposed layer 215. Accordingly, the moisture is preferentially absorbed by the adhesive 33 as compared to the protection film 82, so that the degradation in performance of the protection film 82 can be suppressed. In the meantime, since the moisture is preferentially absorbed by the adhesive 33 as compared to the interposed layer 215, it is possible to suppress deterioration of the interposed layer 215 attributable to excessive moisture adsorption by the interposed layer 215, and thus to suppress reduction in life of the humidity detection unit 210. In addition, since the adhesive 33 is in contact with the interposed layer 215, the moisture absorbed by the interposed layer 215 migrates to the adhesive 33 having the higher water absorption rate than that of the interposed layer 215. Accordingly, it is possible to suppress deterioration of the interposed layer 215 attributable to the moisture adsorption by the interposed layer 215, and thus to suppress the reduction in life of the humidity detection unit 210.

The first drive wiring 91, the protection film 82, and the second drive wiring 92 as well as the first detection electrode 211, the interposed layer 215, and the second detection electrode 212 are formed to have equal heights of the upper surfaces of the respective members based on the upper end surface of the piezoelectric body 70 as a reference. Thus, it is possible to set the heights in the direction of lamination of the respective members equal, so that the respectively members can be attached to the sealing substrate 30 at high precision.

In the present embodiment, the adhesive 33 is in contact with a portion of the upper end surface of the interposed layer 215, and the interposed layer 215 has an exposed portion EX that is exposed to the sealed space. Since the interposed layer 215 is in contact with the sealed space in the holding portion 31, the electric resistance value of the interposed layer 215 is more likely to vary with a change in humidity of the sealed space. Accordingly, the humidity management unit 250 can accurately detect the variation in temperature in the sealed space. Here, the adhesive 33 may be in contact with the entire upper surface of the interposed layer 215, and the interposed layer 215 does not always have to be provided with the exposed portion EX.

Regarding one end portion **70*b* of the piezoelectric body 70 and another end portion 70*a* being a different end portion therefrom, the second detection electrode 212 is formed in such a way as to cover the other end portion 70*a*. By forming the second detection electrode 212 as described above, it is possible to suppress moisture absorption by the piezoelectric body 70 and resultant degradation in performance thereof attributed to exposure of the other end portion 70*a* to the atmosphere on the outside of the sealing substrate 30. Nonetheless, the second detection electrode 212 may be formed only the intermediate layer 84 and need not be formed in such a way as to cover the other end portion 70*a*** instead.

The sealing substrate 30 includes an atmospherically open portion 34 at the ceiling portion 30T. A gas generated at the time of curing the adhesive 33 is discharged through the atmospherically open portion 34, for instance. Thus, it is possible to suppress the occurrence of a difference in pressure between the inside of the sealed space and the outside of the sealing substrate 30. In the present embodiment, the atmospherically open portion 34 is formed at such a position of the ceiling portion 30T which corresponds to a corner of the sealed space. To be more precise, the atmospherically open portion 34 is formed at a position corresponding to an end portion in the −y direction and to an end portion in the +x direction of the sealed space that corresponds to the first pressure chamber line L1. Meanwhile, although illustration is omitted, in the case of the sealing substrate 30 corresponding to the second pressure chamber line L2, the atmospherically open portion 34 is formed at a position corresponding to an end portion in the −y direction and to an end portion in the −x direction of the sealed space that corresponds to the second pressure chamber line L2. That is to say, the atmospherically open portion 34 is formed at the position corresponding to the end portion in the −y direction and to the end portion on an outer side in the x direction of each sealed space. By forming the atmospherically open portions 34 at the above-described positions, it is possible to keep dust or the like that may break in from the outside of the sealing substrate 30 through the atmospherically open portions 34 from adhering to the piezoelectric elements 300. Here, each atmospherically open portion 34 may be formed at a position corresponding to an end portion in the +y direction instead.

Meanwhile, since the atmospherically open portion 34 is located at the position of the ceiling portion 30T which corresponds to the end portion in the +x direction of the sealed space corresponding to the first pressure chamber line L1, a distance between the atmospherically open portion 34 and the protection film 82 becomes larger than a distance between the atmospherically open portion 34 and the interposed layer 215. Accordingly, it is possible to cause the interposed layer 215 to absorb the moisture that breaks in from the outside of the sealing substrate 30 through the atmospherically open portion 34 earlier than the protection film 82 does, thus suppressing moisture absorption by the protection film 82 through the adhesive 33 and suppressing degradation in performance of the protection film 82. Nonetheless, the sealing substrate 30 does not always have to be provided with the atmospherically open portion 34.

As illustrated in FIG. 4, the humidity detection wiring 94 includes first humidity detection wiring 941 that electrically connects the wiring substrate 120 to the first detection electrode 211, and second humidity detection wiring 942 that electrically connects the wiring substrate 120 to the second detection electrode 212. End portions of the first humidity detection wiring 941 and the second humidity detection wiring 942 are extended in such a way as to be exposed to the through hole 32 of the sealing substrate 30, and are electrically connected to the wiring substrate 120 in the through hole 32.

A material of the humidity detection wiring 94 is a conductive material such as gold (Au), copper (Cu), titanium (Ti), tungsten (W), nickel (Ni), chromium (Cr), platinum (Pt), and aluminum (Al). The material of the humidity detection wiring 94 is gold (Au) which is the same as that of the first drive wiring 91, the second drive wiring 92, and the temperature detection wiring 93. However, the humidity detection wiring 94 may adopt an arbitrary material other than gold (Au) or a material different from that of the first drive wiring 91, the second drive wiring 92, and the temperature detection wiring 93.

As illustrated in FIG. 4, wires of the first drive wiring 91, the second drive wiring 92, the temperature detection wiring 93, and the humidity detection wiring 94 are connected to the wiring substrate 120 in this order from the center CP of the liquid ejecting head 510 to an outer side thereof. The "outer side of the liquid ejecting head 510" means a position closer to a peripheral edge portion of the pressure chamber substrate 10 than a predetermined reference position is in terms of a direction to recede from the center CP. The liquid ejecting head 510 of the present embodiment is configured to have the following characteristics by disposing the conductor wiring to be connected to the wiring substrate 120 in the aforementioned order.

Each of the first temperature detection wiring 931 and the second temperature detection wiring 932 is disposed on the outer side of the liquid ejecting head 510 as compared to the first drive wiring 91 and the second drive wiring 92, respectively, and each of the first humidity detection wiring 941 and the second humidity detection wiring 942 is disposed on the outer side of the liquid ejecting head 510 as compared to the first temperature detection wiring 931 and the second temperature detection wiring 932, respectively.

By disposing the temperature detection wiring 93 between the humidity detection wiring 94 and the first drive wiring 91 as well as the second drive wiring 92, it is possible to dispose the first humidity detection wiring 941 and the second humidity detection wiring 942 at positions located away from the first drive wiring 91 and the second drive wiring 92. Accordingly, it is possible to suppress or prevent influences of noises of the drive voltage on the detection of the humidity as regards the first humidity detection wiring 941 and the second humidity detection wiring 942 as compared to the first drive wiring 91 and the second drive wiring 92. Moreover, it is possible to shorten the wiring lengths of the temperature detection resistor 415 and the temperature detection wiring 93 by disposing the first temperature detection wiring 931 and the second temperature detection wiring 932 at positions closer to any of the drive wiring than the first humidity detection wiring 941 and the second humidity detection wiring 942 is, and thus to detect the temperature efficiently.

According to the liquid ejecting head 510 of the above-described embodiment, the first detection electrode 211 and the interposed layer 215 are provided at the positions to overlap the temperature detection resistor 415 in the direction of lamination. As a consequence, it is possible to suppress an increase in size of the liquid ejecting head 510 as compared to a configuration in which none of the first detection electrode 211 and the interposed layer 215 overlap the temperature detection resistor 415. In addition, the piezoelectric body 70 is provided between the temperature detection resistor 415 and the humidity detection unit 210. Accordingly, it is possible to suppress the occurrence of a failure in detecting the humidity due to electric conduction between the humidity detection unit 210 and the temperature detection resistor 415.

In the meantime, since the interposed layer 215 is provided at the position to overlap the temperature detection resistor 415, it is possible to suppress the increase in size of the liquid ejecting head 510 more effectively.

Meanwhile, the first drive electrode 60, the temperature detection resistor 415, and the second detection electrode 212 are provided in this order from the inner side to the outer side of the liquid ejecting head 510 along the direction intersecting with the direction of arrangement and intersecting with the direction of lamination in plan view of the liquid ejecting head 510 along the direction of lamination. Accordingly, it is possible to suppress an increase in size of the liquid ejecting head 510 along the direction intersecting with the direction of arrangement and intersecting with the direction of lamination.

In the meantime, the first detection electrode 211 and the second detection electrode 212 are formed from the same material as that of the second drive electrode 80. Accordingly, the first detection electrode 211 and the second detection electrode 212 can be formed together with the second drive electrode 80 in the forming process of the second drive electrode 80. Thus, the deterioration in productivity of the liquid ejecting head 510 can be suppressed.

Meanwhile, the temperature detection resistor 415 is formed from the same material as that of the first drive electrode 60. Accordingly, the temperature detection resistor 415 can be formed together with the first drive electrode 60 in the forming process of the first drive electrode 60. Thus, the deterioration in productivity of the liquid ejecting head 510 can be suppressed.

B. Other Embodiments (B1) In the above-described embodiment, the liquid ejecting head 510 includes the humidity detection unit 210 configured as the humidity sensor of the resistance detection type. However, the present disclosure is not limited to this configuration. The liquid ejecting head 510 may include a humidity detection unit configured as a humidity sensor of a capacitance type instead of the humidity detection unit 210. In this aspect, the humidity is detected by using a behavior of a dielectric constant of the interposed layer 215 which changes with moisture absorption, thus changing the capacitance thereof. The interposed layer 215 may be formed by using the same material as that of the Embodiment 1. Alternatively, the interposed layer 215 may be formed by using a material suitable for a humidity sensitive film as typified by a polymeric material such as a cellulose compound, a polyvinyl compound, and an aromatic polymer, a metal oxide such as aluminum oxide ($Al_2O_3$) and silicon oxide ($SiO_2$), and so forth.

In this aspect, the liquid ejecting head 510 includes a capacitance measurement unit instead of the humidity detection resistance measurement unit 240. The humidity detection power supply unit 230 applies a predetermined voltage to the humidity detection unit 210 under the control of the humidity management unit 250. The capacitance measurement unit detects capacitance of the humidity detection unit 210 in accordance with a method of measuring time spent until a voltage value of the voltage applied to the humidity detection unit 210 by the humidity detection power supply unit 230 reaches a predetermined reference voltage, for example. A result of detection by the capacitance measurement unit is outputted to the humidity management unit 250.

The humidity management unit 250 derives information concerning humidity of a detection target by using the capacitance of the humidity detection unit 210 obtained from the capacitance measurement unit and a humidity arithmetic expression stored in the storage unit 584 in advance. The humidity arithmetic expression shows a correspondence relation between the capacitance of the detection target and the humidity. A conversion table showing the correspondence relation between the capacitance of the detection target and the humidity may be used instead of the humidity arithmetic expression. Meanwhile, a correspondence relation between the capacitance of the detection target and the temporal change in performance of the detection target may be stored in the storage unit 584. Here, the capacitance may be measured by using various general methods such as a constant-current discharge method. This aspect also exerts the same effects as those of the above-described embodiment.

Figure 8:
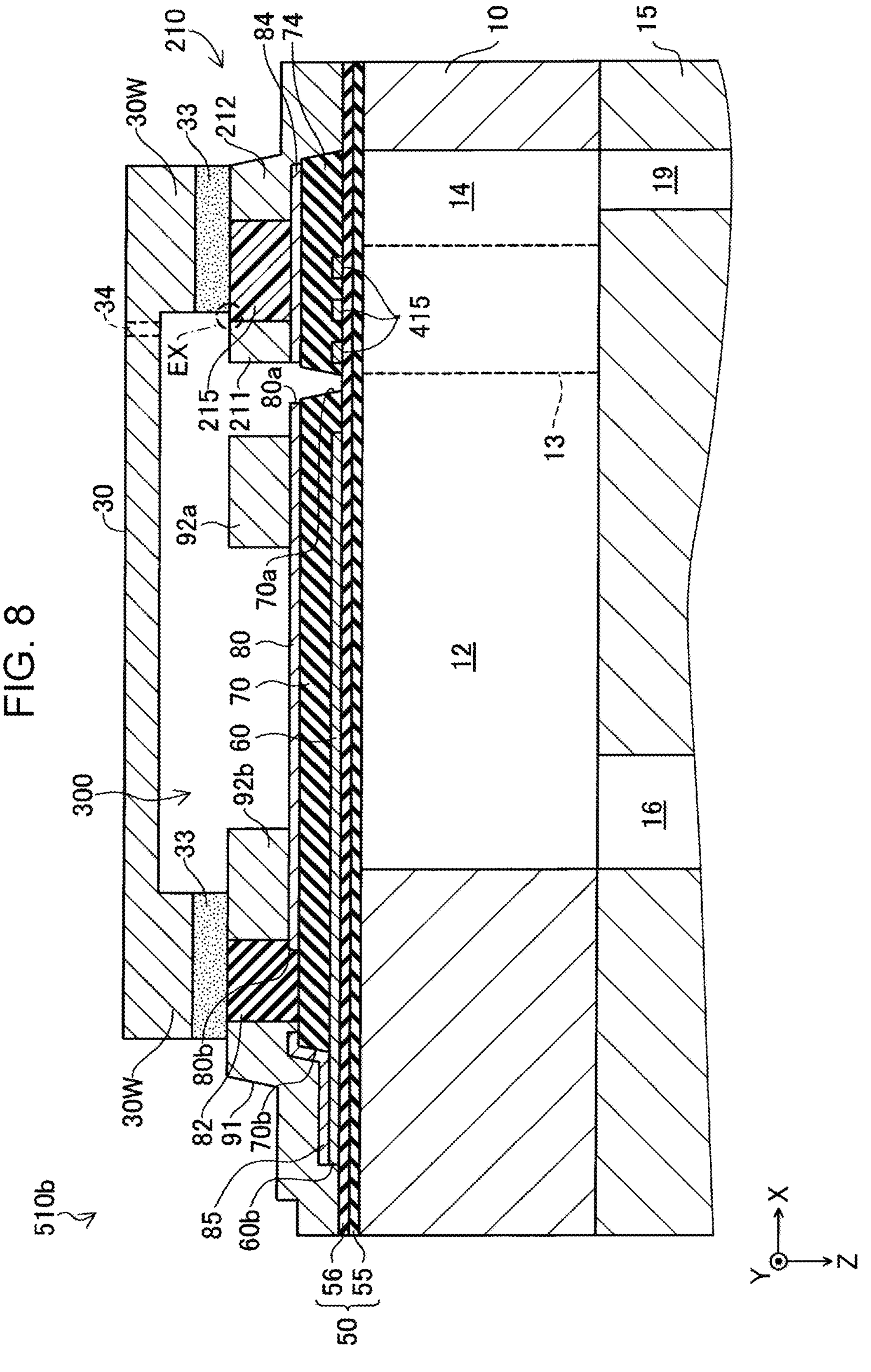
FIG. 8 is a cross-sectional view illustrating the VIII-VIII position in FIG. 6 in a different embodiment.

(B2) In the above-described embodiment, a portion of the second detection electrode 212, the first detection electrode 211, and the interposed layer 215 are formed on the piezoelectric body 70 while interposing the intermediate layer 84 therebetween. However, the present disclosure is not limited to this configuration. FIG. 8 is a cross-sectional view illustrating a configuration of a liquid ejecting head 510*b* of a different embodiment. As illustrated in FIG. 8, a portion of the second detection electrode 212, the first detection electrode 211, and the interposed layer 215 may be formed on an insulating layer 74 being different from the piezoelectric body 70 while interposing the intermediate layer 84 therebetween. In the present embodiment, the insulating layer 74 has an insulation property and is formed from the same material as that of the piezoelectric body 70 and in the same thickness as that of the piezoelectric body 70. Accordingly, as with the above-described embodiment, the humidity detection unit 210 and the temperature detection resistor 415 are separated from each other by using the insulating layer 74. As a consequence, it is possible to suppress the occurrence of a failure in detecting the humidity due to electrical conduction between the humidity detection unit 210 and the temperature detection resistor 415. Meanwhile, the insulating layer 74 is formed from the same material as that of the piezoelectric body 70. Accordingly, the insulating layer 74 can be formed together with the piezoelectric body 70 in the forming process of the piezoelectric body 70. Thus, deterioration in productivity of the liquid ejecting head 510*b* illustrated in FIG. 8 can be suppressed.

In the meantime, the insulating layer 74 is formed on the same layer as the piezoelectric body 70 in a state of being provided with a clearance from the other end portion 70*a* being the end portion in the +x direction of the piezoelectric body 70 so as to be electrically discontinuous with the piezoelectric body 70. Here, although illustration is omitted in FIG. 8, a protective film formed from the same material as that of the protection film 82 may be provided between the piezoelectric body 70 and the insulating layer 74 as with the above-described case between the second drive electrode 80 and the intermediate layer 84. This aspect also exerts the same effects as those of the above-described embodiment. In addition, since the insulating layer 74 is formed in such a way as to be electrically discontinuous with the piezoelectric body 70, it is possible to suppress the occurrence of a piezoelectric strain when the voltage is applied by the first drive electrode 60 and the second drive electrode 80. As a consequence, it is possible to suppress the occurrence of a failure in detecting the humidity and the temperature due to deformations of the first detection electrode 211, the interposed layer 215, the second detection electrode 212, and the temperature detection resistor 415, which would be caused by the occurrence of the piezoelectric strain of the insulating layer 74.

(B3) In the above-described embodiment, the first detection electrode 211 and the interposed layer 215 are provided at the positions to overlap the temperature detection resistor 415 in the direction of lamination. However, the present disclosure is not limited to this configuration. For example, the first detection electrode 211, the interposed layer 215, and the second detection electrode 212 may be provided at positions to overlap the temperature detection resistor 415, or only one of the first detection electrode 211, the interposed layer 215, and the second detection electrode 212 may be provided at a position to overlap the temperature detection resistor 415. Alternatively, a set of the interposed layer 215 and the second detection electrode 212 or a set of the first detection electrode 211 and the second detection electrode 212 may be provided at positions to overlap the temperature detection resistor 415. In other words, at least one of the first detection electrode 211, the interposed layer 215, and the second detection electrode 212 may be provided at a position to overlap the temperature detection resistor 415. According to the above-described aspect, it is possible to suppress an increase in size along the x direction of the liquid ejecting head 510 as compared to a configuration in which none of the first detection electrode 211, the interposed layer 215, and the second detection electrode 212 overlap the temperature detection resistor 415.

(B4) In the above-described embodiment, the first drive electrode 60, the temperature detection resistor 415, and the second detection electrode 212 are provided in this order from the inner side toward the outer side of the liquid ejecting head 510 along the x direction in plan view of the liquid ejecting head 510 along the direction of lamination. However, the present disclosure is not limited to this configuration. The first drive electrode 60, the temperature detection resistor 415, and the second detection electrode 212 may be provided in this order from the inner side toward the outer side of the liquid ejecting head 510 along the y direction in plan view of the liquid ejecting head 510 along the direction of lamination. According to this aspect, it is possible to suppress an increase in size along the y direction of the liquid ejecting head 510.

(B5) In the above-described embodiment, the first drive wiring 91, the second drive wiring 92, the temperature detection wiring 93, and the humidity detection wiring 94 are orthogonal to the wiring substrate 120 as illustrated in FIG. 4. However, the present disclosure is not limited to this configuration. The first drive wiring 91, the second drive wiring 92, the temperature detection wiring 93, and the humidity detection wiring 94 may cross the wiring substrate 120 in an inclined fashion. This aspect also exerts the same effects as those of the above-described embodiment. In addition, it is possible to suppress displacement in the x direction of the first drive wiring 91, the second drive wiring 92, the temperature detection wiring 93, and the humidity detection wiring 94 due to thermal expansion attributed to a variation in temperature thereof, and to suppress the occurrence of a failure in the wiring due to misalignment of wiring patterns.

(B6) In the above-described embodiment, each of the first drive wiring 91 and the second drive wiring 92 is formed by sputtering. However, the present disclosure is not limited to this configuration. Each of the first drive wiring 91 and the second drive wiring 92 may be formed by plating instead. By forming the first drive wiring 91 and the second drive wiring 92 by plating, it is possible to suppress an increase in electrical resistance of the first drive wiring 91 and the second drive wiring 92 as compared to the configuration to form the first drive wiring 91 and the second drive wiring 92 by sputtering. Meanwhile, in the case of forming the first drive wiring 91 and the second drive wiring 92 in accordance with any of sputtering and plating methods, the increase in electrical resistance of the first drive wiring 91 and the second drive wiring 92 can also be suppressed by forming the first drive wiring 91 and the second drive wiring 92 thicker in the direction of lamination. By suppressing the increase in electrical resistance of the first drive wiring 91 and the second drive wiring 92 as described above, the area of the second drive electrode 80 in plan view of the liquid ejecting head 510 along the direction of lamination is reduced along with downsizing of the liquid ejecting head 510. Accordingly, increases in electrical resistance of the first drive wiring 91, the second drive wiring 92, and the entire second drive electrode 80 can be suppressed even in the case where the electrical resistance of the second drive electrode 80 is increased.

(B7) In the above-described embodiment, the interposed layer 215 is formed by using the material having the higher water absorption rate than that of the protection film 82. However, the present disclosure is not limited to this configuration. The interposed layer 215 may be formed from the same material as that of the protection film 82. According to this aspect, a magnitude of difference in degree of deterioration due to moisture absorption by the interposed layer 215 and the protection film 82 is suppressed, so that the deterioration of the protection film 82 can be accurately detected in the case of the occurrence of a failure due to deterioration of the protection film 82 attributable to the relatively high temperature and humidity.

(B8) In the above-described embodiment, the water absorption rate of the adhesive 33 is higher than the water absorption rate of the interposed layer 215. However, the present disclosure is not limited to this configuration. The water absorption rate of the adhesive 33 may be equal to the water absorption rate of the interposed layer 215. In this aspect, the interposed layer 215 may be formed by using the same material as that of the adhesive 33. According to this aspect, it is possible to unify a forming process of the interposed layer 215 and an attaching process of the sealing substrate 30, so that the reduction in productivity of the liquid ejecting head 510 can be suppressed. Alternatively, the adhesive 33 may be formed by using the same material as that of the interposed layer 215 and the protection film 82. According to this aspect, it is possible to unify the forming process of the interposed layer 215 as well as the protection film and the attaching process of the sealing substrate 30, so that the reduction in productivity of the liquid ejecting head 510 can further be suppressed.

(B9) In the above-described embodiment, the entire protection film 82 is formed from the same material. However, the present disclosure is not limited to this configuration. Of the protection film 82, a portion that comes into contact with each of the second drive electrode 80 and the piezoelectric body 70 may be formed from a material having a lower water absorption rate than that of the remaining portion, and the remaining portion may be formed from the same material as that of the adhesive 33. This aspect also exerts the same effects as those of the above-described embodiment. In addition, it is possible to suppress an increase in manufacturing cost of the liquid ejecting head 510 even when the material having the higher water absorption rate is more costly.

(B10) In the above-described embodiment, the adhesive 33 is in contact with a portion of the upper end surface of the interposed layer 215. However, the present disclosure is not limited to this configuration. The adhesive 33 may be in contact only with the upper end surface of the second detection electrode 212 without being in contact with the upper end surface of the interposed layer 215. According to this aspect, the entire upper end surface of the interposed layer 215 can be brought into contact with the sealed space, so that the humidity management unit 250 can detect the change in humidity of the sealed space more accurately.

(B11) In the above-described embodiment, the humidity detection unit 210 is formed by laminating the first detection electrode 211, the interposed layer 215, and the second detection electrode 212 in the x direction. However, the present disclosure is not limited to this configuration. The humidity detection unit 210 may be formed by laminating the first detection electrode 211, the interposed layer 215, and the second detection electrode 212 in the z direction. This aspect also exerts the same effects as those of the above-described embodiment.

(B12) In the above-described embodiment, the atmospherically open portion 34 is formed at the position of the ceiling portion 30T corresponding to the end portion in the −y direction and to the end portion in the +x direction of the sealed space that corresponds to the first pressure chamber line L1. However, the present disclosure is not limited to this configuration. The atmospherically open portion 34 may be formed at a position of the ceiling portion 30T corresponding to a central portion in the −y direction and to an end portion in the +x direction of the sealed space that corresponds to the first pressure chamber line L1. The atmospherically open portion 34 is located at a position of the ceiling portion 30T corresponding to the end portion in the +x direction of the sealed space that corresponds to the first pressure chamber line L1 in this aspect as well. Hence, the distance between the atmospherically open portion 34 and the protection film 82 can be set larger than the distance between the atmospherically open portion 34 and the interposed layer 215. Accordingly, it is possible to cause the interposed layer 215 to absorb the moisture that breaks in from the outside of the sealing substrate 30 through the atmospherically open portion 34 earlier than the protection film 82 does, thus suppressing moisture absorption by the protection film 82 and suppressing degradation of the performance of the protection film 82.

(B13) Each of the above-described embodiments has demonstrated the example of using the piezoelectric element 300 as the drive element. On the other hand, a heat-generating element including a heater may be used as the drive element. In this case, each pressure chamber is provided with the heater so as to eject the ink from the nozzle by changing the pressure in the pressure chamber by use of a bubble generated at the time of heating with the heater. A liquid ejecting head adopting this aspect can also achieve the same effects as those of the respective embodiments described above.

(B14) In the above-described embodiment, the interposed layer 215 is formed from epoxy resin and the protection film 82 is formed from polyimide. However, the present disclosure is not limited to this configuration. The interposed layer 215 may be formed from a type of polyimide having a higher water absorption rate than that of the type of polyimide used for the protection film 82.

C. Other Modes

The present disclosure is not limited only to the above-described embodiments but can also be realized by various configurations within the range not departing from the gist thereof. For example, technical features in the embodiments corresponding to the technical features in the respective aspects described in the section of summary can be replaced or combined as appropriate in order to solve part or all of the problems or to achieve part of all of the above-described effects. Meanwhile, a technical feature can be omitted as appropriate unless the relevant technical feature is explained as an essential feature in the present specification.

(1) According to an aspect of the present disclosure, there is provided a liquid ejecting head. This liquid ejecting head includes: a piezoelectric element in which a first drive electrode, a piezoelectric body, and a second drive electrode are laminated; a humidity detection unit used for detecting a humidity, which includes a first detection electrode, an interposed layer, and a second detection electrode; and a temperature detection unit used for detecting a temperature, which includes a temperature detection resistor. The piezoelectric body is provided between the temperature detection resistor and the humidity detection unit in a direction of lamination in which the first drive electrode, the piezoelectric body, and the second drive electrode are laminated. Moreover, at least one of the first detection electrode, the interposed layer, and the second detection electrode is provided at a position to overlap the temperature detection resistor in the direction of lamination. According to the liquid ejecting head of this aspect, at least one of the first detection electrode, the interposed layer, and the second detection electrode is provided at the position to overlap the temperature detection resistor in the direction of lamination. It is therefore possible to suppress an increase in size of the liquid ejecting head as compared to the configuration in which none of the first detection electrode, the interposed layer, and the second detection electrode overlap the temperature detection resistor. In addition, the piezoelectric body is provided between the temperature detection resistor and the humidity detection unit. As a consequence, it is possible to suppress the occurrence of a failure in detecting the humidity due to electric conduction between the humidity detection unit and the temperature detection resistor.

(2) In the liquid ejecting head of the above-described aspect, the interposed layer may be provided at the position to overlap the temperature detection resistor in the direction of lamination. According to the liquid ejecting head of this aspect, since the interposed layer is provided at the position to overlap the temperature detection resistor, it is possible to suppress the increase in size of the liquid ejecting head more effectively.

(3) The liquid ejecting head of the above-described aspect may further include a pressure chamber substrate including a plurality of pressure chambers each configured to contain a liquid and to communicate with a nozzle. Here, the first drive electrode, the temperature detection resistor, and the second detection electrode may be provided in this order from an inner side toward an outer side of the liquid ejecting head along a direction intersecting with a direction of arrangement being a direction in which the plurality of pressure chambers are arranged and the direction of lamination in plan view of the liquid ejecting head along the direction of lamination. According to the liquid ejecting head of this aspect, the first drive electrode, the temperature detection resistor, and the second detection electrode are provided in this order from the inner side toward the outer side of the liquid ejecting head along the direction intersecting with the direction of arrangement and the direction of lamination in plan view of the liquid ejecting head along the direction of lamination. As a consequence, it is possible to suppress the increase in size of the liquid ejecting head along the direction intersecting with the direction of arrangement and the direction intersecting with the direction of lamination.

(4) The liquid ejecting head of the above-described aspect may further include a wiring substrate. Here, the humidity detection unit may further include humidity detection wiring electrically connected to the wiring substrate, and the humidity detection wiring may be provided in such a way as to interpose the plurality of pressure chambers in the direction of arrangement and may be connected to the wiring substrate in an inclined fashion relative to the direction of arrangement. According to the liquid ejecting head of this aspect, the humidity detection wiring is connected to the wiring substrate in an inclined fashion in the direction of arrangement. Thus, it is possible to suppress displacement in the direction orthogonal to the direction of arrangement due to thermal expansion attributed to a variation in temperature of the humidity detection wiring, and to suppress the occurrence of a failure in the wiring due to misalignment of wiring patterns.

(5) In the liquid ejecting head of the above-described aspect, the first detection electrode and the second detection electrode may be formed from the same material as that of the second drive electrode. According to the liquid ejecting head of this aspect, since the first detection electrode and the second detection electrode are formed from the same material as that of the second drive electrode, the first detection electrode and the second detection electrode can be formed together with the second drive electrode in the forming process of the second drive electrode. Thus, deterioration in productivity of the liquid ejecting head can be suppressed.

(6) In the liquid ejecting head of the above-described aspect, the temperature detection resistor may be formed from the same material as that of the first drive electrode. According to the liquid ejecting head of this aspect, since the temperature detection resistor is formed from the same material as that of the first drive electrode, the temperature detection resistor can be formed together with the first drive electrode in the forming process of the first drive electrode. Thus, the deterioration in productivity of the liquid ejecting head can be suppressed.

(7) According to another aspect of the present disclosure, there is provided a liquid ejecting system. This liquid ejecting system includes the liquid ejecting head of the above-described aspect, and a control unit that calculates the humidity by using a result of detection by the humidity detection unit. According to the liquid ejecting system of this aspect, at least one of the first detection electrode, the interposed layer, and the second detection electrode is provided at the position to overlap the temperature detection resistor in the direction of lamination. It is therefore possible to suppress an increase in size of the liquid ejecting head as compared to the configuration in which none of the first detection electrode, the interposed layer, and the second detection electrode overlap the temperature detection resistor.

The present disclosure can also be realized in various modes other than the liquid ejecting head and the liquid ejecting system. For example, the present disclosure can be realized in a mode of a method of manufacturing a liquid ejecting head, a mode of a method of manufacturing a liquid ejecting system provided with the liquid ejecting head, and so forth.

The present disclosure is also applicable to arbitrary liquid ejecting apparatuses not only of an ink jet mode but also of modes of ejecting liquids other than the ink, as well as to liquid ejecting heads used in these liquid ejecting apparatuses. For example, the present disclosure is applicable to various liquid ejecting apparatuses and liquid ejecting heads used therein as cited below:

(1) an image printing apparatus such as a facsimile apparatus;
(2) a color material ejecting apparatus used for manufacturing a color filter for an image display device such as a liquid crystal display device;
(3) an electrode material ejecting apparatus used for forming electrodes of an organic electroluminescence (EL) display device, a field emission display (FED) device, and the like;
(4) a liquid ejecting apparatus for ejecting a liquid containing a bioorganic material used for manufacturing a biochip;
(5) a sample ejecting apparatus serving as a precision pipette;
(6) a lubricant oil ejecting apparatus;
(7) a resin liquid ejecting apparatus;
(8) a liquid ejecting apparatus for performing pinpoint ejection of a lubricant oil on precision machinery such as a watch and a camera;
(9) a liquid ejecting apparatus for ejecting a transparent resin liquid such as an ultraviolet curable resin liquid for forming a micro-semispherical lens (an optical lens) used in an optical communication device and the like;
(10) a liquid ejecting apparatus for ejecting an acidic or alkaline etchant for etching a substrate and the like; and
(11) a liquid ejecting apparatus including a liquid consumption head for ejecting a small amount of any other arbitrary liquid droplets.

The "liquid" only needs to be a material that is consumable by a liquid ejecting apparatus. For instance, the "liquid" only needs to be a material of which substance is in a liquid state, and materials in a liquid state such as materials in a state of a high-viscosity or low-viscosity liquid, sol, gel water, other inorganic solvents, organic solvents, liquid solutions, liquid resins, and liquid metals (metallic melts) are also included in the relevant "liquid". Meanwhile, the "liquid" includes not only the liquid in a state of matter but also a substance obtained by dissolving, dispersing, or mixing particles of a functional material in the form of a solid such as pigments and metal particles into a solvent. Here, representative examples of the liquid include the following:

(1) a base compound and a curing agent of an adhesive;
(2) any of a base material as well as a diluent of paint, and clear paint as well as a diluent therefor;
(3) a prime solvent containing cells for a bioink, and a diluent therefor;
(4) a metallic leaf pigment dispersion liquid and a diluent solvent for an ink (a metallic ink) that exhibits metallic luster;
(5) a vehicle fuel such as gasoline, light oil, and bio fuel;
(6) a main medical component and a protective component of a medicine; and
(7) phosphor and a sealant in a light-emitting diode (LED).

What is claimed is:

1. A liquid ejecting head comprising:
a piezoelectric element in which a first drive electrode, a piezoelectric body, and a second drive electrode are laminated;
a humidity detection unit used for detecting a humidity, including a first detection electrode, an interposed layer, and a second detection electrode; and
a temperature detection unit used for detecting a temperature, including a temperature detection resistor, wherein
the piezoelectric body is provided between the temperature detection resistor and the humidity detection unit in a direction of lamination in which the first drive electrode, the piezoelectric body, and the second drive electrode are laminated, and
at least one of the first detection electrode, the interposed layer, and the second detection electrode is provided at a position to overlap the temperature detection resistor in the direction of lamination.

2. The liquid ejecting head according to claim 1, wherein the interposed layer is provided at the position to overlap the temperature detection resistor in the direction of lamination.

3. The liquid ejecting head according to claim 1, wherein the first detection electrode is provided at the position to overlap the temperature detection resistor in the direction of lamination.

4. The liquid ejecting head according to claim 1, wherein the second detection electrode is provided at the position to overlap the temperature detection resistor in the direction of lamination.

5. The liquid ejecting head according to claim 1, wherein the first detection electrode, the interposed layer, and the second detection electrode are provided at the position to overlap the temperature detection resistor in the direction of lamination.

6. The liquid ejecting head according to claim 1, further comprising:
a pressure chamber substrate including a plurality of pressure chambers each configured to contain a liquid and to communicate with a nozzle, wherein
the first drive electrode, the temperature detection resistor, and the second detection electrode are provided in this order from an inner side toward an outer side of the liquid ejecting head along a direction intersecting with a direction of arrangement being a direction in which the plurality of pressure chambers are arranged and the direction of lamination in plan view of the liquid ejecting head along the direction of lamination.

7. The liquid ejecting head according to claim 6, further comprising:
a wiring substrate, wherein
the humidity detection unit further includes humidity detection wiring electrically connected to the wiring substrate, and
the humidity detection wiring is provided in such a way as to interpose the plurality of pressure chambers in the direction of arrangement, and is connected to the wiring substrate in an inclined fashion relative to the direction of arrangement.

8. The liquid ejecting head according to claim 1, wherein the first detection electrode and the second detection electrode are formed from a material identical to a material of the second drive electrode.

9. The liquid ejecting head according to claim 1, wherein the temperature detection resistor is formed from a material identical to a material of the first drive electrode.

10. A liquid ejecting system comprising:

the liquid ejecting head according to claim 1; and a control unit that calculates the humidity by using a result of detection by the humidity detection unit.

* * * * *